(12) United States Patent
Kawamoto et al.

(10) Patent No.: US 7,487,549 B2
(45) Date of Patent: Feb. 3, 2009

(54) INFORMATION PROCESSING APPARATUS, INFORMATION PROCESSING METHOD, RECORDING MEDIUM, AND PROGRAM

(75) Inventors: Yoji Kawamoto, Tokyo (JP); Ryuji Ishiguro, Tokyo (JP); Yuichi Ezura, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 10/480,626

(22) PCT Filed: Apr. 10, 2003

(86) PCT No.: PCT/JP03/04549

§ 371 (c)(1),
(2), (4) Date: Dec. 12, 2003

(87) PCT Pub. No.: WO03/088059

PCT Pub. Date: Oct. 23, 2003

(65) Prior Publication Data

US 2004/0210762 A1    Oct. 21, 2004

(30) Foreign Application Priority Data

Apr. 15, 2002   (JP) .............................. 2002-112110

(51) Int. Cl.
*G06F 21/22* (2006.01)
*H04L 9/00* (2006.01)
*H04K 1/00* (2006.01)

(52) U.S. Cl. ........................................ 726/27; 713/193
(58) Field of Classification Search .................... 726/30
See application file for complete search history.

(56) References Cited

U.S. PATENT DOCUMENTS 5,379,433 A * 1/1995 Yamagishi .................... 726/30
6,463,445 B1 * 10/2002 Suzuki et al. ............... 707/200
6,721,802 B1 * 4/2004 Wright et al. ............... 709/246

(Continued)

FOREIGN PATENT DOCUMENTS

CN          1321266         11/2001

(Continued)

OTHER PUBLICATIONS

Supplementary European Search Report dated Oct. 29, 2007 in corresponding European Application No. EP 03 71 9097.

*Primary Examiner*—Christopher A Revak
(74) *Attorney, Agent, or Firm*—Finnegan, Henderson, Farabow, Garrett & Dunner, L.L.P.

(57) ABSTRACT

The present invention relates to an information processing apparatus, an information processing method, a recording medium, and a program for importing and exporting a content with information missing controlled. A CPU extracts a sound track contained in the content in step S301, and converts a format of the extracted sound track into a format compatible with a memory stick in step S302. The CPU generates a predetermined file from data contained in the content and excluding the sound track in step S304. In step S306, the CPU attaches reference information of the sound track to the file. In step S307, the CPU controls the writing of the sound track in the converted format and the file to the memory stick. The present invention is applied to clients of a DRM system.

9 Claims, 31 Drawing Sheets

U.S. PATENT DOCUMENTS

| | | | |
|---|---|---|---|
| 6,798,885 B1 * | 9/2004 | Malcolm | 380/42 |
| 6,856,970 B1 * | 2/2005 | Campbell et al. | 705/35 |
| 7,010,581 B2 * | 3/2006 | Brown et al. | 709/218 |
| 7,062,547 B2 * | 6/2006 | Brown et al. | 709/221 |
| 7,133,925 B2 * | 11/2006 | Mukherjee et al. | 709/231 |
| 2002/0136411 A1 | 9/2002 | Ishiguro et al. | |
| 2003/0009681 A1 * | 1/2003 | Harada et al. | 713/193 |
| 2003/0198351 A1 * | 10/2003 | Foster et al. | 380/281 |
| 2004/0205452 A1 * | 10/2004 | Fitzsimons et al. | 715/500 |
| 2005/0283791 A1 * | 12/2005 | McCarthy et al. | 725/1 |
| 2006/0015649 A1 * | 1/2006 | Zutaut et al. | 709/246 |
| 2006/0159109 A1 * | 7/2006 | Lamkin et al. | 370/401 |
| 2006/0161635 A1 * | 7/2006 | Lamkin et al. | 709/217 |

FOREIGN PATENT DOCUMENTS

| | | |
|---|---|---|
| EP | 1 058 255 | 12/2000 |
| EP | 1081574 A1 * | 3/2001 |
| EP | 1 152 397 | 11/2001 |
| EP | 1 158 416 A1 | 11/2001 |
| JP | 2001-51906 | 2/2001 |
| JP | 2001-215974 | 8/2001 |
| JP | 2001-236080 | 8/2001 |
| JP | 2001-243707 | 9/2001 |
| JP | 2001-352321 | 12/2001 |
| WO | WO 00/28539 | 5/2000 |

* cited by examiner

FIG. 8

| VERSION |
|---|
| PROFILE |
| RIGHT OF USE ID |
| DATE OF PRODUCTION |
| EXPIRATION DATE |
| CONDITIONS OF USE |
| ELECTRONIC SIGNATURE FOR CONDITIONS OF USE |
| CONTENT CONDITIONS |
| CONSTANT NUMBER |
| LEAF ID |
| ELECTRONIC SIGNATURE |
| CERTIFICATE |

FIG. 13

| VERSION : t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 14

| VERSION : t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

INFORMATION PROCESSING APPARATUS, INFORMATION PROCESSING METHOD, RECORDING MEDIUM, AND PROGRAM

TECHNICAL FIELD

The present invention relates to an information processing apparatus, an information processing method, a recording medium, and a program and, in particular, to an information processing apparatus, an information processing method, a recording medium and a program for preventing an unauthorized copying and use of a content without license permitted by a copyright holder.

BACKGROUND ART

There are systems in which a plurality of users exchange music data free of charge. In such a system, one user, who holds music data, may provide another user with the music data through the Internet, and then may receive different music data from another user.

If one content such as a piece of music is available in such a system, all users can theoretically enjoy that content. Many users may then stop purchasing the same content. The copyright holder misses the chance of receiving royalties for the use of the content even if the content is sold.

Society requires that an unauthorized use of any content be prevented without impeding the circulation of contents.

In known DRM (Digital Rights Management) systems for protecting the copyright of a content, one device has difficulty in importing a content from another device of a different format or a different method, and in exporting a content of its own to the other device.

When a content is imported or exported, a part of information of the content may be sometimes missing.

The other device has been unable to handle an imported or exported content in the same way as other contents are handled. In other words, the other device cannot handle the contents in a consistent manner.

DISCLOSURE OF INVENTION

The present invention has been developed in view of this problem, and it is an object of the present invention to import and export a content with information of the content prevented from missing and to handle imported or exported contents in the same way as other contents.

A first information processing apparatus of the present invention includes extracting means for extracting content data contained in the content, converting means for converting a format of the extracted content data into a predetermined format compatible with the storage medium, generating means for generating a predetermined file from data, contained in the content and excluding the content data, attaching means for attaching reference information of the content data in the converted format to the file, and first write control means for controlling the writing of the content data in the converted format and the file to the storage medium.

The information processing apparatus of the present invention may includes second write control means for controlling the writing of information, concerning the right of use required to use the content, to the storage medium.

A first information processing method of the present invention includes an extracting step for extracting content data contained in the content, a converting step for converting a format of the extracted content data into a predetermined format compatible with the storage medium, a generating step for generating a predetermined file from data, contained in the content and excluding the content data, an attaching step for attaching reference information of the content data in the converted format to the file, and a write control step for controlling the writing of the content data in the converted format and the file to the storage medium.

A program of a first recording medium of the present invention includes an extracting step for extracting content data contained in the content, a converting step for converting a format of the extracted content data into a predetermined format compatible with the storage medium, a generating step for generating a predetermined file from data, contained in the content and excluding the content data, an attaching step for attaching reference information of the content data in the converted format to the file, and a write control step for controlling the writing of the content data in the converted format and the file to the storage medium.

A first program of the present invention causes a computer to execute an extracting step for extracting content data contained in the content, a converting step for converting a format of the extracted content data into a predetermined format compatible with the storage medium, a generating step for generating a predetermined file from data, contained in the content and excluding the content data, an attaching step for attaching reference information of the content data in the converted format to the file, and a write control step for controlling the writing of the content data in the converted format and the file to the storage medium.

A second information processing apparatus of the present invention includes acquisition means for acquiring the content data from the storage medium, converting means for converting the content data acquired by the acquisition means into data in a predetermined format to generate a content, encrypting means for encrypting the content data, in the converted format, contained in the content generated by the converting means, and for attaching key information for decrypting the encrypted content data to the content, and attaching means for attaching, to the contents information for associating a right of use required to use the content with the content.

The information processing apparatus of the present invention may further include storage means for storing the right of use required to use the input content.

A second information processing method of the present invention includes an acquisition step for acquiring the content data from the storage medium, a converting step for converting the content data acquired in the acquisition step into data in a predetermined format to generate a content, an encrypting step for encrypting the content data, in the converted format, contained in the content generated in the converting step, and for attaching key information for decrypting the encrypted content data to the content, and an attaching step for attaching, to the content, information for associating a right of use required to use the content with the content.

A program of a second recording medium of the present invention includes an acquisition step for acquiring the content data from the storage medium, a converting step for converting the content data acquired in the acquisition step into data in a predetermined format to generate a content, an encrypting step for encrypting the content data, in the converted format, contained in the content generated in the converting step, and for attaching key information for decrypting the encrypted content data to the content, and an attaching step for attaching, to the content, information for associating a right of use required to use the content with the content.

A second program of the present invention causes a computer to execute an acquisition step for acquiring the content data from the storage medium, a converting step for converting the content data acquired in the acquisition step into data in a predetermined format to generate a content, an encrypting step for encrypting the content data, in the converted format, contained in the content generated in the converting step, and for attaching key information for decrypting the encrypted content data to the content, and an attaching step for attaching, to the content, information for associating a right of use required to use the content with the content.

In the first information processing apparatus, the first information processing method, the first recording medium, and the first program in accordance with the present invention, the content data contained in the content is extracted, and the format of the extracted content data is converted into the predetermined format compatible with the storage medium. The predetermined file is generated from the data contained in the content and excluding the content data, and the reference information of the content data in the converted format is attached to the file. The writing of the content data in the converted format and the file to the storage medium is controlled.

The image processing apparatus may be a standalone apparatus, or a block that performs information processing in a replay apparatus or a recording and replay apparatus.

Any useful information is acceptable as the content and the form of the information, such as sound, image, or text is not important.

Any medium is acceptable as the storage medium as long as the medium stores the content according to a physical change or a chemical change taking place therewithin.

In the second information processing apparatus, the second information processing method, the second recording medium, and the second program in accordance with the present invention, the content data is acquired from the storage medium, the acquired content data is converted into the predetermined format to generate the content. The content data in the converted format contained in the content is encrypted, and the key information for decrypting the encrypted content data is attached to the content. The information for associating the right of use required to use the content with the content is attached to the content.

The image processing apparatus may be a standalone apparatus, or a block that performs information processing in a replay apparatus or a recording and replay apparatus.

Any useful information is acceptable as the content and the form of the information, such as sound, image, or text is not important.

Any medium is acceptable as the storage medium as long as the medium stores the content according to a physical change or a chemical change taking place therewithin.

BRIEF DESCRIPTION OF THE DRAWINGS

FIG. 8 illustrates the structure of the right of use.

FIG. 13 illustrates the structure of an enabling key block.

FIG. 14 illustrates the structure of the enabling key block.

BEST MODE FOR CARRYING OUT THE INVENTION

Figure 1:
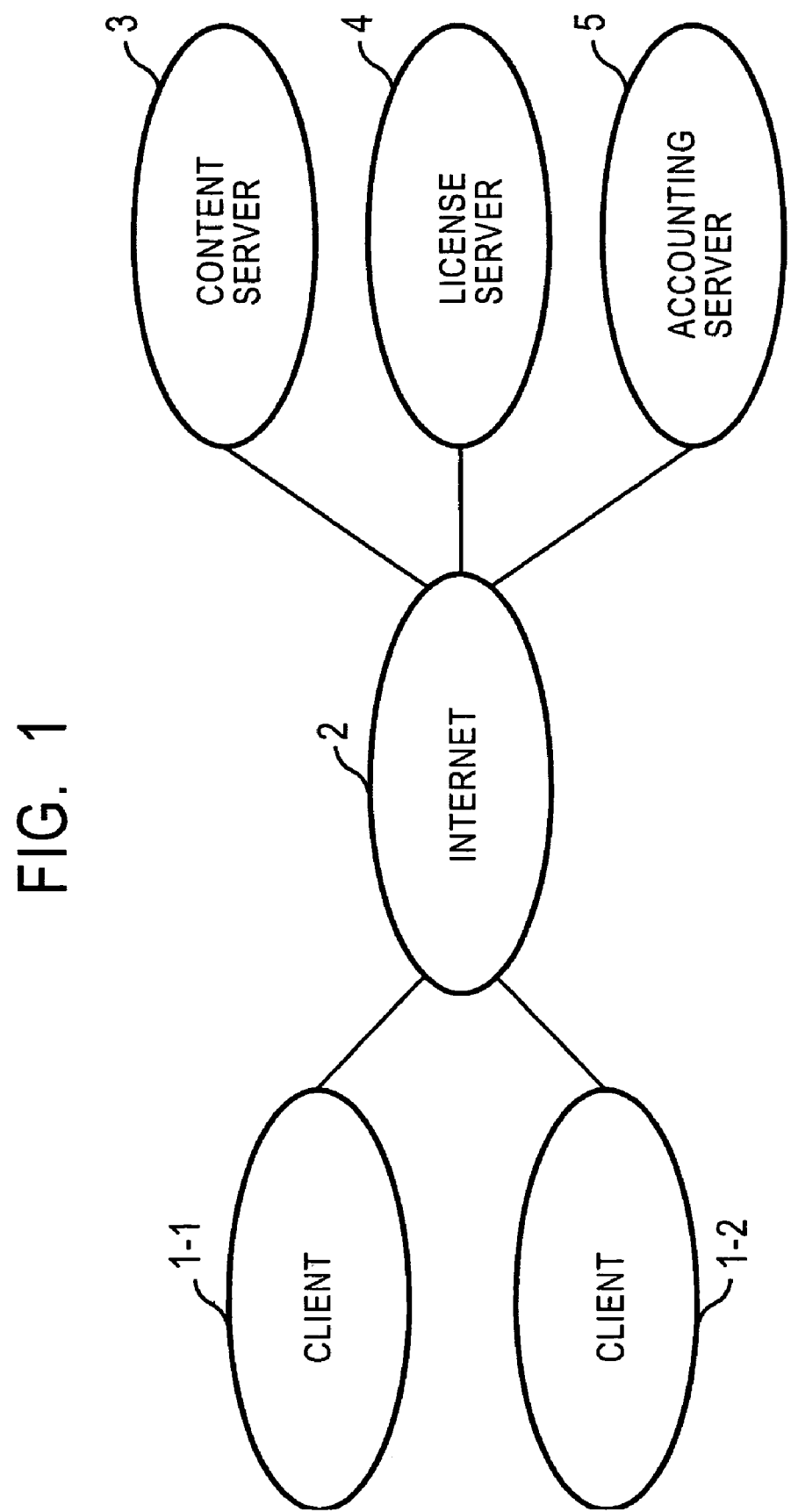
FIG. 1 is a block diagram illustrating the structure of a content providing system implementing the present invention.

FIG. 1 illustrates a content providing system implementing the present invention. Clients 1-1 and 1-2 (hereinafter simply referred to as client 1 if there is no need for discriminating between these clients) are connected to the Internet 2. In this example, only two clients are shown, but clients of any numbers are connected to the Internet 2.

Also connected to the Internet 2 are a content server 3 for providing the client 1 with a content, a license server 4 for granting to the client 1 a right of use required to use the content provided by the content server 3, and a accounting server 5 that performs an accounting process to the client 1 when the client 1 is granted the right of use.

The content servers 3 of any number, the license servers 4 of any number, and the accounting servers 5 of any number are connected to the Internet 2.

Figure 2:
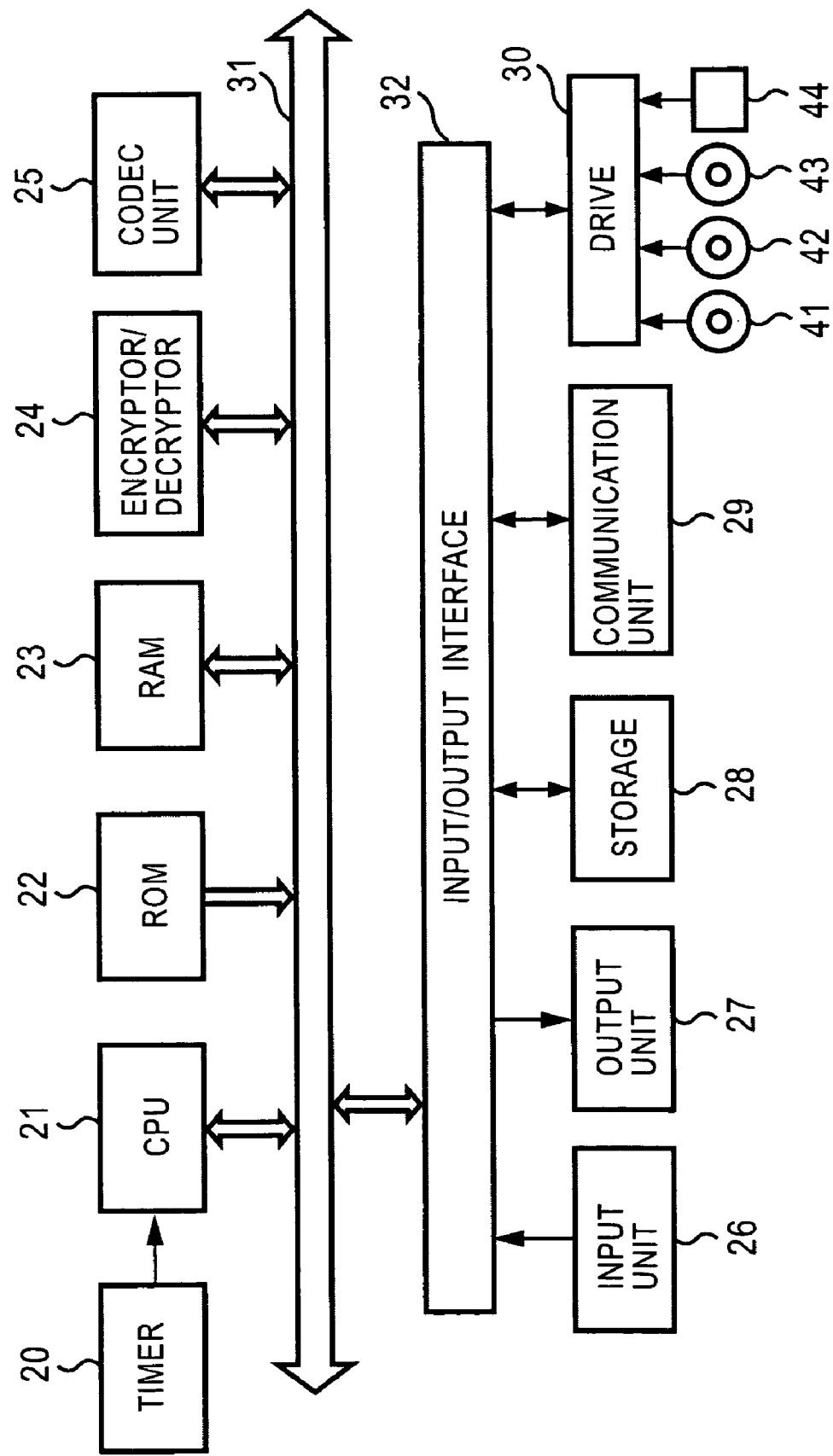
FIG. 2 is a block diagram illustrating the structure of a client of FIG. 1.

FIG. 2 is a block diagram illustrating the structure of a client of FIG. 1.

As shown, a CPU (Central Processing Unit) 21 performs a variety of processes in accordance with a program stored in an ROM (Read Only Memory) 22 and a program loaded in an RAM (Random Access Memory) 23 from a storage 28. A timer 20 measures time, thereby supplying the CPU 21 with time information. As necessary, the RAM 23 also stores data the CPU 21 requires to execute the variety of processes.

An encryptor/decryptor 24 encrypts the content data while also decrypting already encrypted content data. A codec unit 25 encodes the content data using an ATRAC (Adaptive Transform Acoustic Coding) 3 method, for example, and supplies a semiconductor memory 44, connected to a drive 30, with the encoded data through an input/output interface 32 to be recorded in the semiconductor memory 44. The codec unit 25 also decodes the encoded data read from the semiconductor memory 44 through the drive 30.

The semiconductor memory 44 includes a memory stick (trademark), for example.

The CPU 21, the ROM 22, the RAM 23, the encryptor/decryptor 24, and the codec unit 25 are mutually interconnected through a bus 31. The bus 31 is also connected to the input/output interface 32.

Also connected to the input/output interface 32 are an input unit 26 including a keyboard, a mouse, etc., an output unit 27 including a display, such as a CRT or an LCD, and a loudspeaker, etc., a storage 28 including a hard disk, etc., and a communication unit 29 including a modem, a terminal adaptor, etc. The communication unit 29 performs communications through the Internet 2. The communication unit 29 also performs a communication process with other clients using an analog signal or a digital signal.

Also connected to the input/output interface 32 is the drive 30, in which a magnetic disk 41, an optical disk 42, a magneto-optical disk 43, and a semiconductor memory 44 are loaded as necessary. A computer program read from each of these media is installed in the storage 28 as necessary.

Each of the content server 3, the license server 4, and the accounting server 5 includes a computer that has substantially the same structure as the client 1 shown in FIG. 2 although the structure of these apparatuses are not shown. In the discussion that follows, the structure illustrated in FIG. 2 is also referred to as the structure of each of the content server 3, the license server 4, and the accounting server 5.

A PD (Portable Device), although not shown here, includes a computer that has the substantially the same structure as the client 1 shown in FIG. 2.

Figure 3:
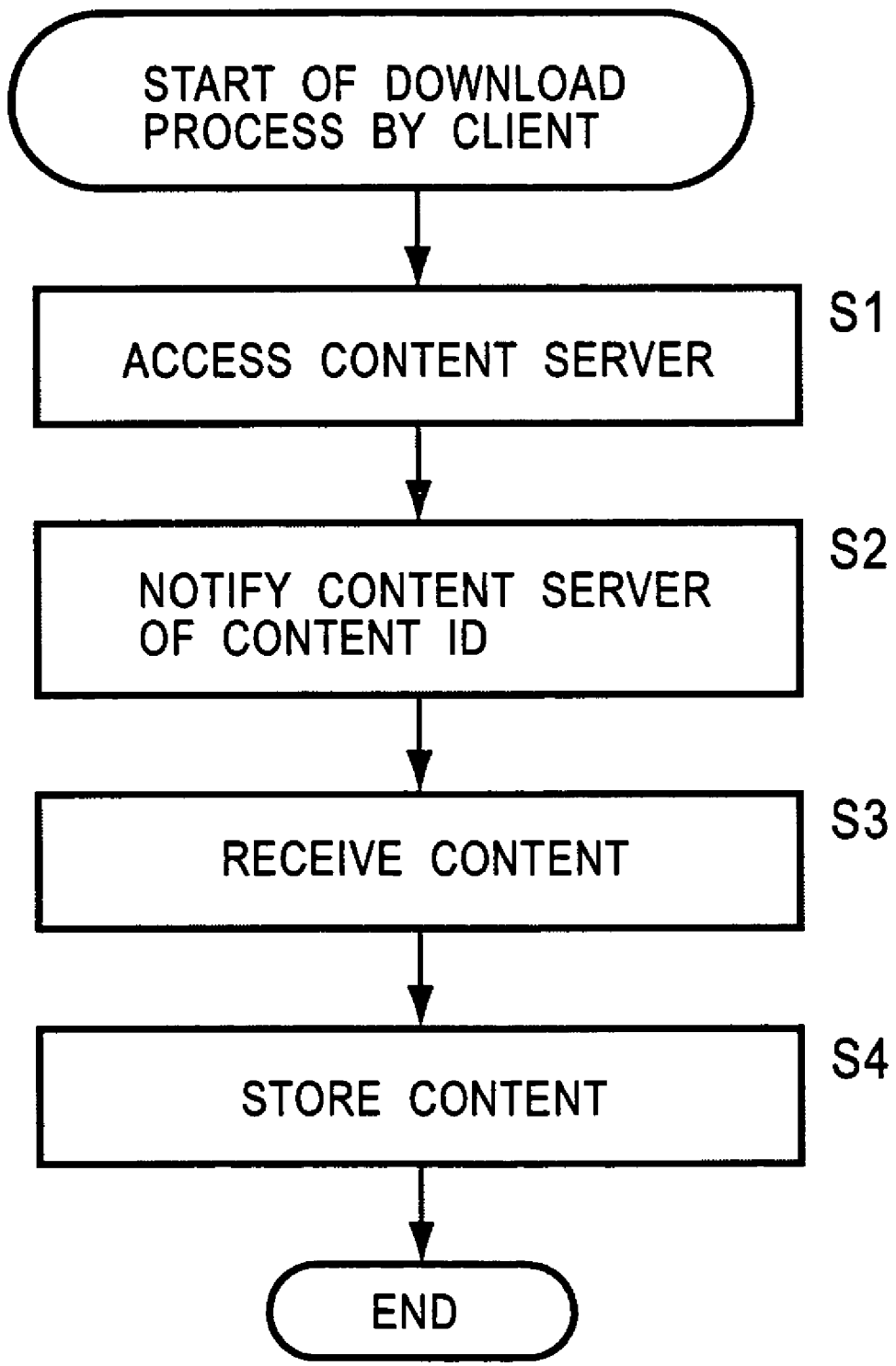
FIG. 3 is a flow diagram illustrating a process of the client of FIG. 1 for downloading a content.

A process of the client 1 for receiving a service of supply of contents from the content server 3 is discussed with reference to a flow diagram illustrated in FIG. 3.

When the user issues an access command to access the content server 3 by operating the input unit 26, the CPU 21 controls the communication unit 29, causing the communication unit 29 to access the content server 3 through the Internet 2 in step S1. When the user designates a content to be delivered by operating the input unit 26 in step S2, the CPU 21 receives the designate information. The CPU 21 notifies the content server 3 of a content ID of the designated content through the Internet 2. As will be discussed later with reference to a flow diagram shown FIG. 4, the content server 3 having received that notification transmits the content containing an encrypted content data. Upon receiving the content data through the communication unit 29 in step S3, the CPU 21 provides a hard disk as the storage 28 with the encrypted content data for storage in step S4.

Figure 4:
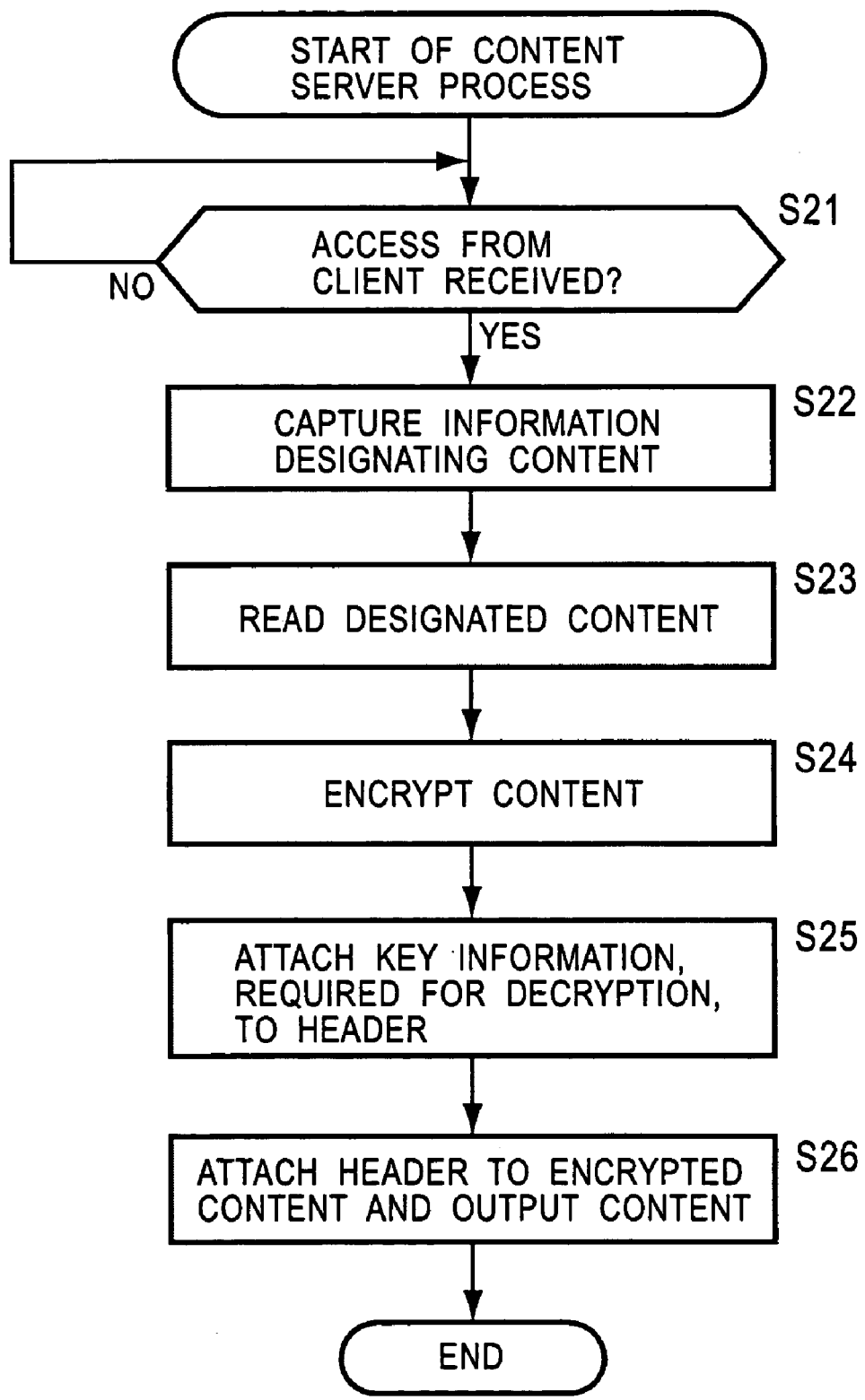
FIG. 4 is a flow diagram illustrating a process of a content server of FIG. 1 for providing a content.

A content providing process of the content server 3 in response to the above-referenced process of the client 1 is discussed with reference to a flow diagram shown in FIG. 4. In the discussion that follows, the structure of the client 1 shown in FIG. 2 is also referred to as the structure of the content server 3.

In step S21, the CPU 21 of the content server 3 waits on standby until receiving an access from the client 1 from the communication unit 29 through the Internet 2. When the CPU 21 determines that the access from the client 1 has been received, the algorithm proceeds to step S22. The CPU 21 captures the content ID transmitted from the client 1. The content ID is the information the client 1 has notified the content server 3 of in step S2 shown in FIG. 3.

In step S23, the CPU 21 in the content server 3 reads content data, designated by the content ID captured in the process of step S22, from among contents stored in the storage 28. In step S24, the CPU 21 supplies the encryptor/decryptor 24 with the content data read from the storage 28, thereby encrypting the content data using a content key Kc.

The content data, stored in the storage 28 and already encoded through the ATRAC 3 by the codec unit 25, is encrypted.

Optionally, the content data in the encrypted form thereof may be stored in the storage 28. In this case, the process in step S24 may be omitted.

In step S25, the CPU 21 in the content server 3 attaches key information (EKB and $K_{EKBC}$ (Kc) to be discussed later with reference to FIG. 5) required to decrypt the encrypted content to a header forming a format according to which the encrypted content data is transmitted. In step S26, the CPU 21 in the content server 3 transmits, through the Internet 2 from the communication unit 29 to the client 1 which has made access thereto, data in which the content encrypted in the process of step S24 and the header to which the key information is attached in the process in step S25 are formatted.

Figure 5:
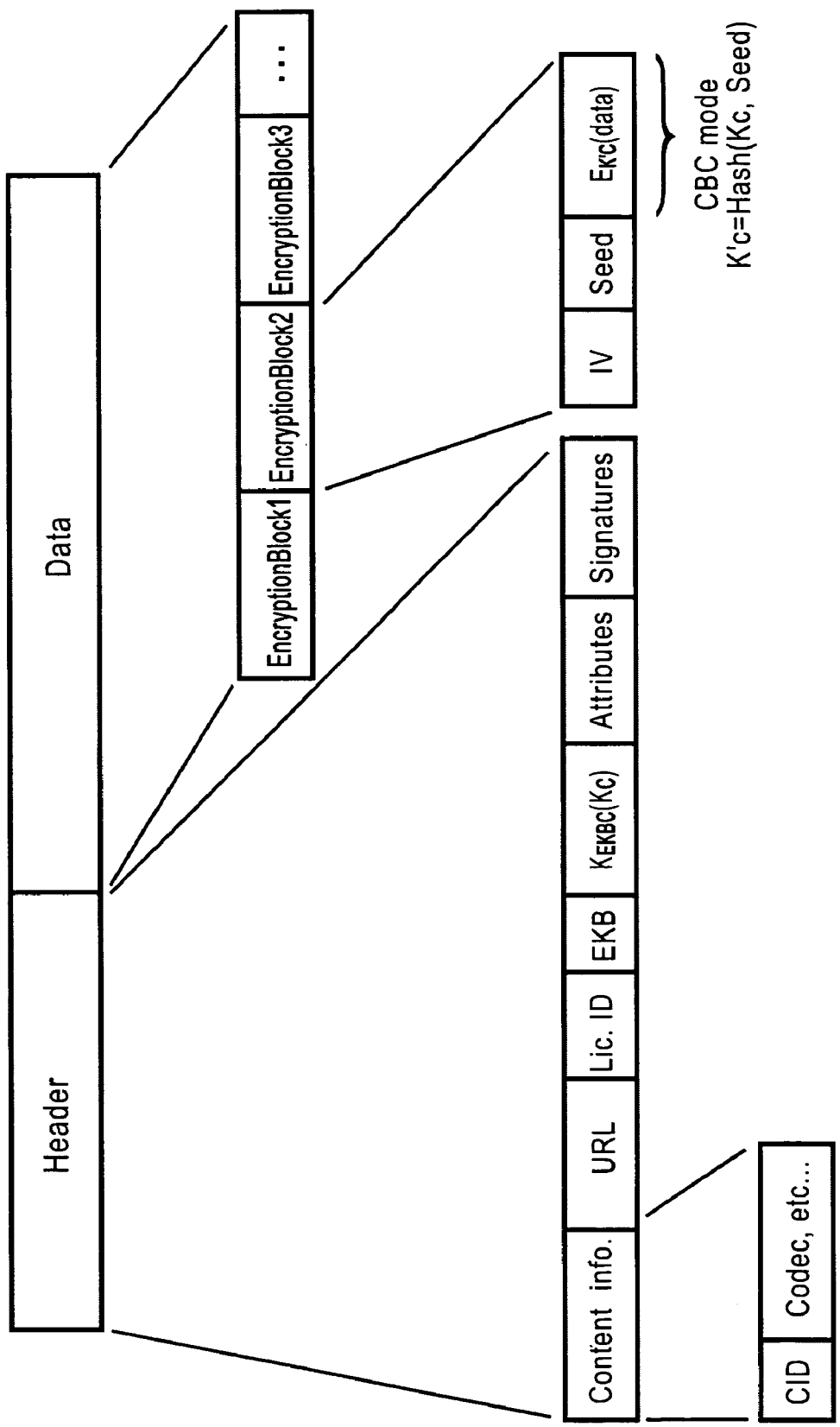
FIG. 5 illustrates a format in step S26 of FIG. 4.

FIG. 5 illustrates the structure of the format in which the content is provided to the client 1 from the content server 3 in this way. As shown, the format is composed of a header and data.

The header includes content information, URL (Uniform Resource Locator), enabling key block (EKB), data $K_{EKBC}$ (Kc) as a content key Kc that is encrypted using a key $K_{EKBC}$ generated from EKB, content attributes, and signatures. EKB will be discussed later with reference to FIG. 13 and FIG. 14.

The content information includes information such as a content ID (CID) as identification information for identifying the content data that is formatted as data, and a codec method of the content.

The URL is address information which is accessed to gain the right of use required to use the content. In the system illustrated in FIG. 1, the URL is the address of the license server 4 required to gain the right of use.

The content attributes are information relating to the content, and include a content ID, a record company ID as identification information to identify a provider of a content, an artist ID as identification information to identify an artist, etc. In this embodiment, the attributes are used to identify the content for which the right of use is issued.

The signature is an electronic signature corresponding to the attribute of the content.

The data includes an optional number of encryption blocks. Each encryption block includes an initial vector (IV), a seed, and data $E_{K'c}$(data) into which the content data is encrypted using a key K'c.

The key K'c is a value that is calculated by applying, to the hash function, the content key Kc and a seed value set using random numbers as shown in the following equation.

$$K'c = Hash(Kc, Seed)$$

Each of the initial vector IV and the seed is set to be a value different from encryption block to encryption block.

The data of the content is divided by 8 bytes and then encrypted 8 bytes by 8 bytes. The encryption is performed in a CBC (Cipher Block Chaining) in which later 8 bytes are encrypted based on the result of encryption of earlier 8 bytes.

When the first 8 bytes of the content data are encrypted in the CBC mode, no encryption result of earlier 8 bytes is present. To encrypt the first 8 bytes of the content data, the initial vector IV is used as an initial value.

The use of the CBC mode in the encryption process controls the effect of decryption of one block over the other encryption blocks.

The encryption method is not limited to this method.

The client 1 thus acquires the content from the content server 3 at will free of charge. The content itself is thus distributed in bulk.

To use the acquired content, the client 1 must hold the right of use indicating that the use of the content is permitted. A process of the client 1 for reproducing the content will now be discussed with reference to FIG. 6.

In step S41, the CPU 21 in the client 1 acquires the content identification information (CID) that is designated by the user who operates the input unit 26. The identification information includes, for example, a title of a content, and a number given to each stored content.

When the content is designated, the CPU 21 reads attribute of the content. The attribute is described in the header of the content as illustrated in FIG. 5.

The algorithm proceeds to step S42, and the CPU 21 determines whether the right of use is gained by the client 1 and is stored in the storage 28. The attribute read in step S41 must satisfy content conditions in the right of use. If the right of use is not gained, the algorithm proceeds to step S43 where the CPU 21 performs a right of use acquisition process. The right of use acquisition process will be discussed later with reference to a flow diagram illustrated in FIG. 7.

If it is determined in step S42 that the right of use has already been acquired, or if the right of use has been acquired as a result of execution of the right of use acquisition process in step S43, the algorithm proceeds to step S44. The CPU 21 determines whether the acquired right of use is still valid before the expiration date thereof. The determination of whether the right of use is valid or not is performed by comparing the expiration date defined as the substance of the right of use (see FIG. 8 to be discussed later) with the present date and time measured by the timer 20. If it is determined that the validity of the right of use has already expired, the CPU 21 proceeds to step S45 and executes a right of use renewal process.

If it is determined in step S44 that the right of use is still valid, or if the right of use is renewed, the algorithm proceeds to step S46. The CPU 21 reads the conditions of use contained in the right of use and the state of use (to be discussed later), and determines whether conditions for reproduction are satisfied.

If the CPU 21 determines in step S46 that the reproduction is permitted based on the conditions of use contained in the right of use and the state of use, the algorithm proceeds to step S47. The CPU 21 reads the encrypted content data from the storage 28, and stores the encrypted content data in the RAM 23. In step S48, the CPU 21 supplies the encryptor/decryptor 24 with the encrypted content data stored in the RAM 23 an encryption block by encryption block basis, the encryption block being arranged as shown in a data structure in FIG. 5. The encrypted content data is thus decrypted using the content key Kc.

A specific method to gain the content key Kc will be discussed later with reference to FIG. 13 and FIG. 14. A key $K_{EKBC}$ contained in EKB (FIG. 5) is obtained using a device node key (DNK), and the content key Kc is obtained from the data $K_{EKBC}$(Kc) (FIG. 5) using the key $K_{EKBC}$.

In step S49, the CPU 21 supplies the codec unit 25 with the content data decrypted by the encryptor/decryptor 24 for decoding. The CPU 21 feeds data decoded by the codec unit 25 to the output unit 27 through the input/output interface 32 for a D/A conversion, and then outputs the D/A converted data through the loudspeaker.

If it is determined in step S46 that the reproduction is not permitted based on the conditions of use contained in the right of use and the state of use, the content is not output and the reproduction process ends.

Figure 6:
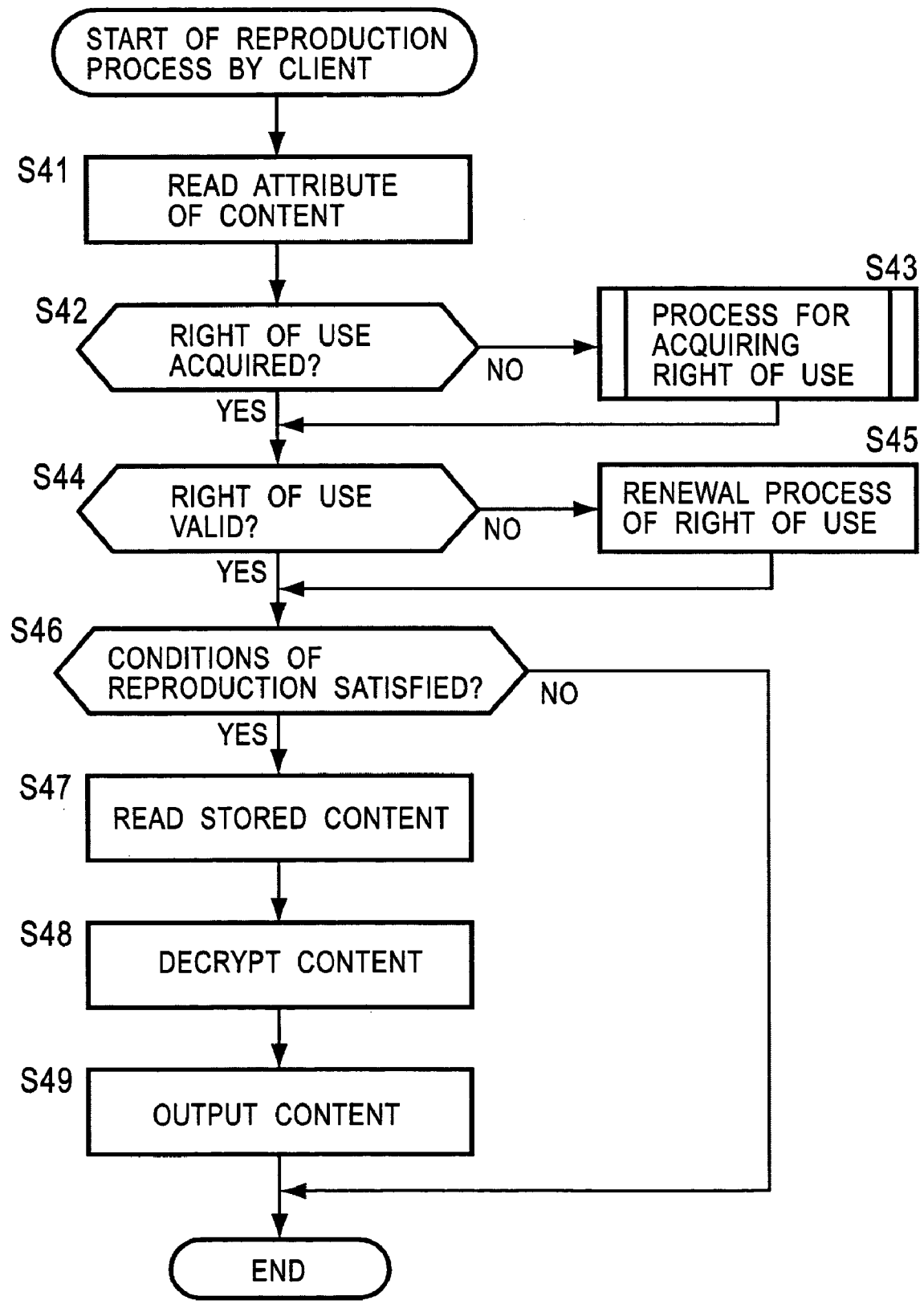
FIG. 6 is a flow diagram illustrating a process of the client of FIG. 1 for reproducing a content.

The right of use acquisition process carried out in step S43 shown in FIG. 6 will now be discussed in detail with reference to the flow diagram shown in FIG. 7.

By registering itself in the license server beforehand, the client 1 acquires service data containing a leaf ID, DNK (Device Node Key), a pair of a private key and a public key of the client 1, a public key of the license server, and certificates of the public keys.

The leaf ID is identification information assigned to each client, and the DNK is a device node key (to be discussed later with reference to FIG. 10) required to decrypt the content key Kc which is already encrypted by the EKB (enabling key block) contained in the content.

In step S61, the CPU 21 first acquires a URL described in the header of the content. As already discussed, the URL is the address which must be accessed to acquire the right of use required to use the content. In step S62, the CPU 21 accesses the URL acquired in step S61. More specifically, the communication unit 29 accesses the license server 4 through the Internet 2. The license server 4 transmits a list of rights of use to the client 1 while requesting the client 1 to input right of use designating information designating the right of use (the right of use required to use the content), a user ID, and a password (in step S102 in FIG. 9 as will be discussed later). The CPU 21 presents that request on a display of the output unit 27. In response to the display, the user operates the input unit 26, thereby inputting the right of use designating information, the user ID, and the password. The user ID and the password are those the user of the client 1 has already obtained by accessing the license server 4 through the Internet 2.

In steps S63 and S64, the CPU 21 captures the right of use designating information input from the input unit 26 while capturing the user ID and the password at the same time. In step S65, the CPU 21 controls the communication unit 29, thereby transmitting the input user ID and password, the right of use designating information, and the right of use request containing the leaf ID in service data (to be discussed later) to the license server 4 through Internet 2.

Figure 9:
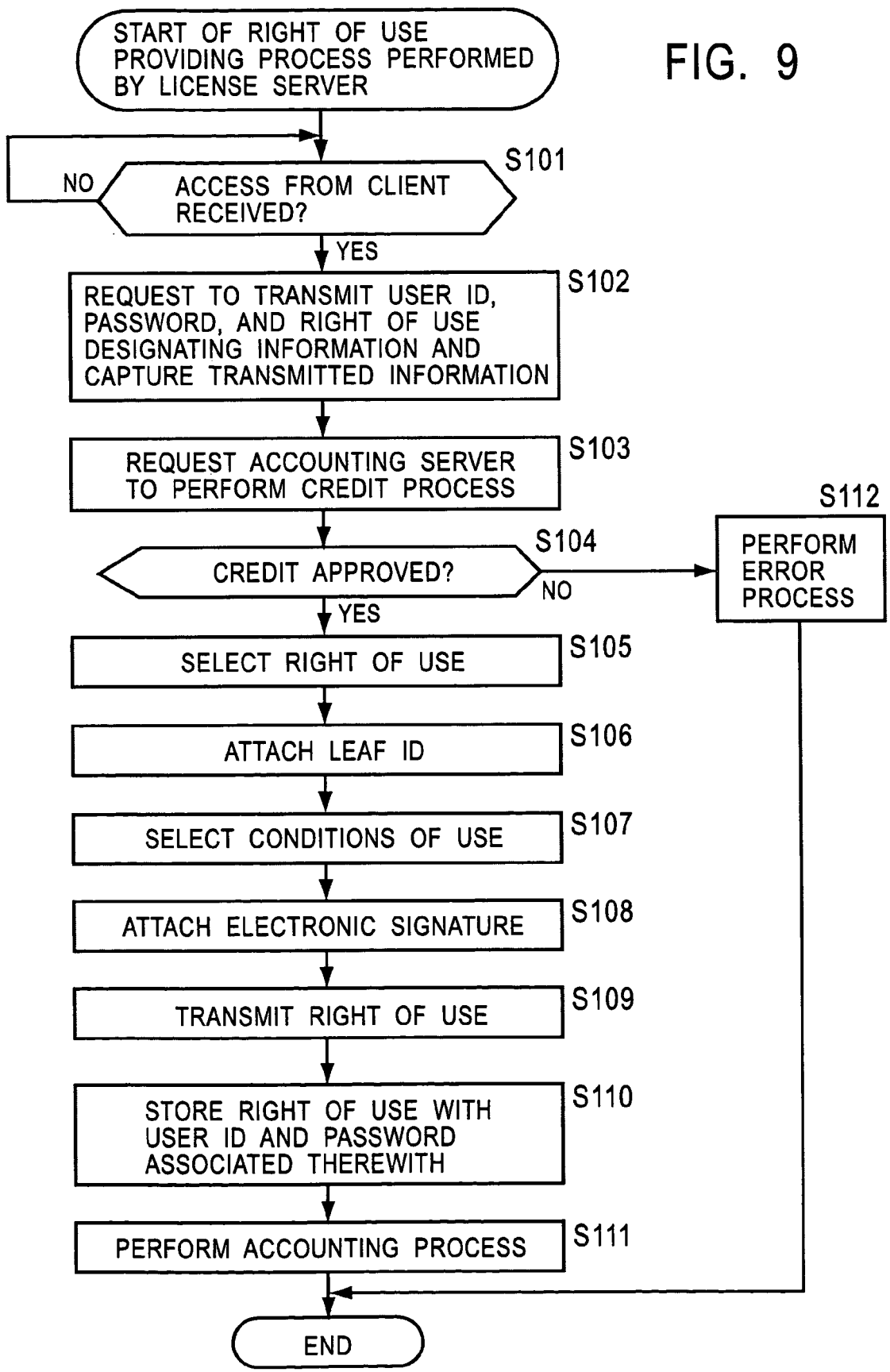
FIG. 9 is a flow diagram illustrating a process of a license sever of FIG. 1 for providing the right of use.

As will be discussed later with reference to FIG. 9, the license server 4 may transmit the user ID, the password, and the right of use based on the right of use designating information (step S109), or may not transmit the right of use if the conditions are not satisfied (step S112).

In step S66, the CPU 21 determines whether the license server 4 has transmitted the right of use. If the CPU 21 determines that the license server 4 has transmitted the right of use, the algorithm proceeds to step S67. The CPU 21 transfers the right of use to the storage 28 and stores the right of use there.

If it is determined in step S66 that no right of use is transmitted, the CPU 21 proceeds to step S68 and executes an error process. More specifically, the CPU 21 inhibits the reproduction of the content because the right of use for the content has not been granted.

As described above, each client 1 can use the content only after the client 1 acquires the right of use required to use the content.

Figure 7:
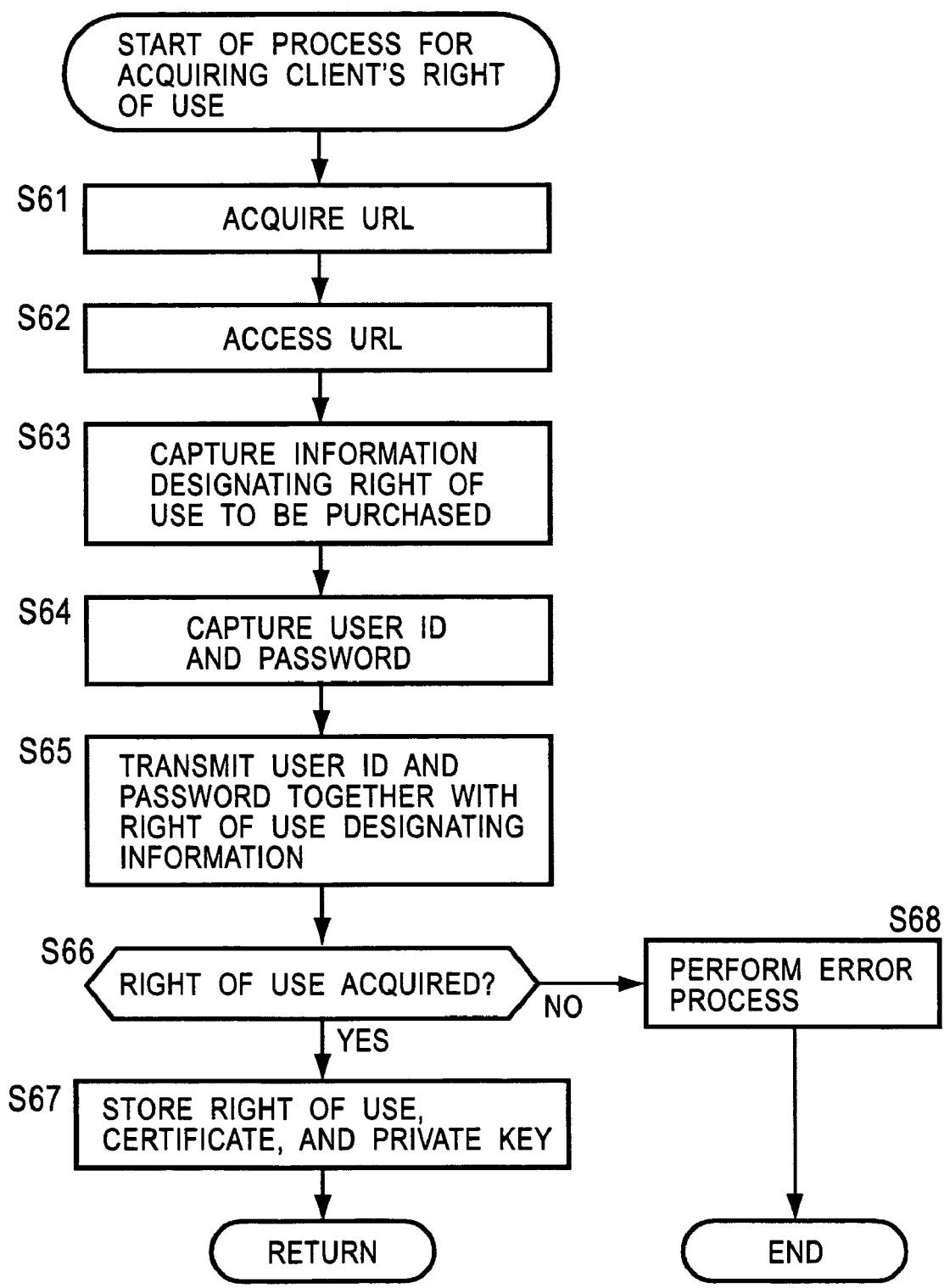
FIG. 7 is a flow diagram illustrating a right of use acquisition process in detail in step S43 of FIG. 6.

The right of use acquisition process illustrated in FIG. 7 may be completed before each user acquires the content.

The right of use granted to the client 1 includes the conditions of use, the leaf ID, and the electronic signature as shown in FIG. 8, for example.

A version is information describing a version of the right of use with a major version and a minor version delimited by a dot.

A profile, formed of a description of decimal integers, is information defining a limitation on a description method of the right of use.

A right of use ID, formed of a description of hexadecimal constant, is identification information identifying the right of use.

A date of production indicates the data and time at which the right of use is produced.

An expiration date indicates the expiration date of the right of use. The expiration date of 9999 year 23 hours 59 minutes and 59 seconds means that no expiration date is set.

Conditions of use includes information concerning the expiration date of the content based on the right of use, the expiration date of content reproduction until which the content reproduction is permitted based on the right of use, the maximum number of reproductions of the content, the maximum number of copying operations of the content (the number of copies permitted), the maximum number of checkouts, whether the content is recorded onto a CD-R based on the right of use, the number of permissible copying operations to a PD (Portable Device), the transferability of the right of use, the presence or absence of obligation to log, etc.

An electronic signature for the conditions of use is an electronic signature corresponding to the conditions of use.

A constant number is the one which is referenced under the conditions of use or the state of use.

A leaf ID is identification information for identifying the client.

An electronic signature is the one for the entire right of use.

A certificate is the one containing a public key of the license server.

The storage 28 in the client 1 stores the state of use representing the state of the content and the right of use, together with the conditions of use of the right of use. The state of use contains information concerning the number of performed reproductions based on the corresponding right of use, the number of performed copying operations of the content, the number of performed checkouts of the content, the date and time at which the content is reproduced for the first time, the number of performed recording operations of the content onto a CD-R, and further history information of the content or the right of use.

The determination of the conditions of reproduction in step S46 is performed based on the conditions of use contained in the right of use and the state of use stored together with the right of use in the storage 28. For example, if the number of performed reproductions of the content stored in the state of use is smaller than the maximum number of reproductions of the content contained in the conditions of use, the conditions of reproduction are determined to be satisfied.

A right of use providing process of the license server 4 performed in response to the right of use acquisition process of the client 1 illustrated in FIG. 7 is discussed with reference to a flow diagram illustrated in FIG. 9. In this case as well, the structure of the client 1 illustrated in FIG. 2 is referred to as the structure of the license server 4.

In step S101, the CPU 21 in the license server 4 waits on standby until the license server 4 receives an access from the client 1. Upon receiving an access, the algorithm proceeds to step S102. The CPU 21 transmits a list of rights of use containing information relating the right of use to the client 1 which has accessed thereto, while requesting the client 1 to transmit the user ID, the password, and the right of use designating information. When the client 1 transmits the user ID, the password, the leaf ID and the right of use designating information (or a right of use ID) in the process in step S65 as already discussed, the CPU 21 in the license server 4 receives and captures these pieces of information through the communication unit 29.

In step S103, the CPU 21 in the license server 4 accesses the accounting server 5 through the communication unit 29, thereby requesting the accounting server 5 to perform a credit process for the user designated by the user ID and the password. Upon receiving the request for the credit process from the license server 4 through the Internet 2, the accounting server 5 examines past payment history of the user designated by the user ID and the password. The accounting server 5 examines the user for any past record for no payment for the right of use. If any record for no payment is not found, an examination result of granting the right of use is transmitted. If any record for no payment is found, a denial to granting the right of use is transmitted.

In step S104, the CPU 21 in the license server 4 determines whether or not the examination result is to grant the right of use. If the right of use is granted, the algorithm proceeds to step S105. The CPU 21 in the license server 4 retrieves the right of use corresponding to the right of use designating information captured in step S102 from among the rights of use stored in the storage 28. Information such as the right of use ID, the version, the date and time of production, and the expiration date is described beforehand in the right of use stored in the storage 28. In step S106, the CPU 21 attaches the leaf ID to the received right of use. In step S107, the CPU 21 selects the condition of use associated with the right of use selected in step S105. If the conditions of use are designated by the user in the process of step S102, the conditions of use are attached to the already prepared conditions of use. The CPU 21 attaches the selected conditions of use to the right of use. The conditions of use may be attached to the right of use beforehand.

In step S108, the CPU 21 signs the right of use with a private key of the license server, and attaches a certificate containing a public key of the license server to the right of use. In this way the right of use having the structure shown in FIG. 8 is generated.

In step S109, the CPU 21 in the license server 4 transmits the right of use (having the structure illustrated in FIG. 8) to the client 1 from the communication unit 29 through the Internet 2.

In step S110, the CPU 21 in the license server 4 stores, in the storage 28, the right of use (containing the conditions of use and the leaf ID) right now transmitted in step S109 with the user ID and the password captured in the process in step S102 associated with the right of use. In step S111, the CPU 21 performs an accounting process. More specifically, using the communication unit 29, the CPU 21 requests the accounting server 5 to perform the accounting process to the user designated by the user ID and the password. In response to the request, the accounting server 5 performs the accounting process to the user. As already discussed, the user who has failed to pay in response to the accounting process cannot receive the right of use even if the user requests the granting of the right of use thereafter.

In this case, the accounting server 5 issues the examination result that the right of use grant request is denied, and the algorithm proceeds from step S104 to step S112. The CPU 21 carries out an error process. More specifically, using the communication unit 29, the CPU 21 in the license server 4 transmits, to the client 1 which has accessed thereto, a message to the effect that the right of use cannot be issued, and then ends the process.

As described above, the client 1 who cannot receive the right of use as described above cannot use the content either (the client 1 is unable to decrypt the encrypted content data and reproduce the decrypted content data).

Figure 10:
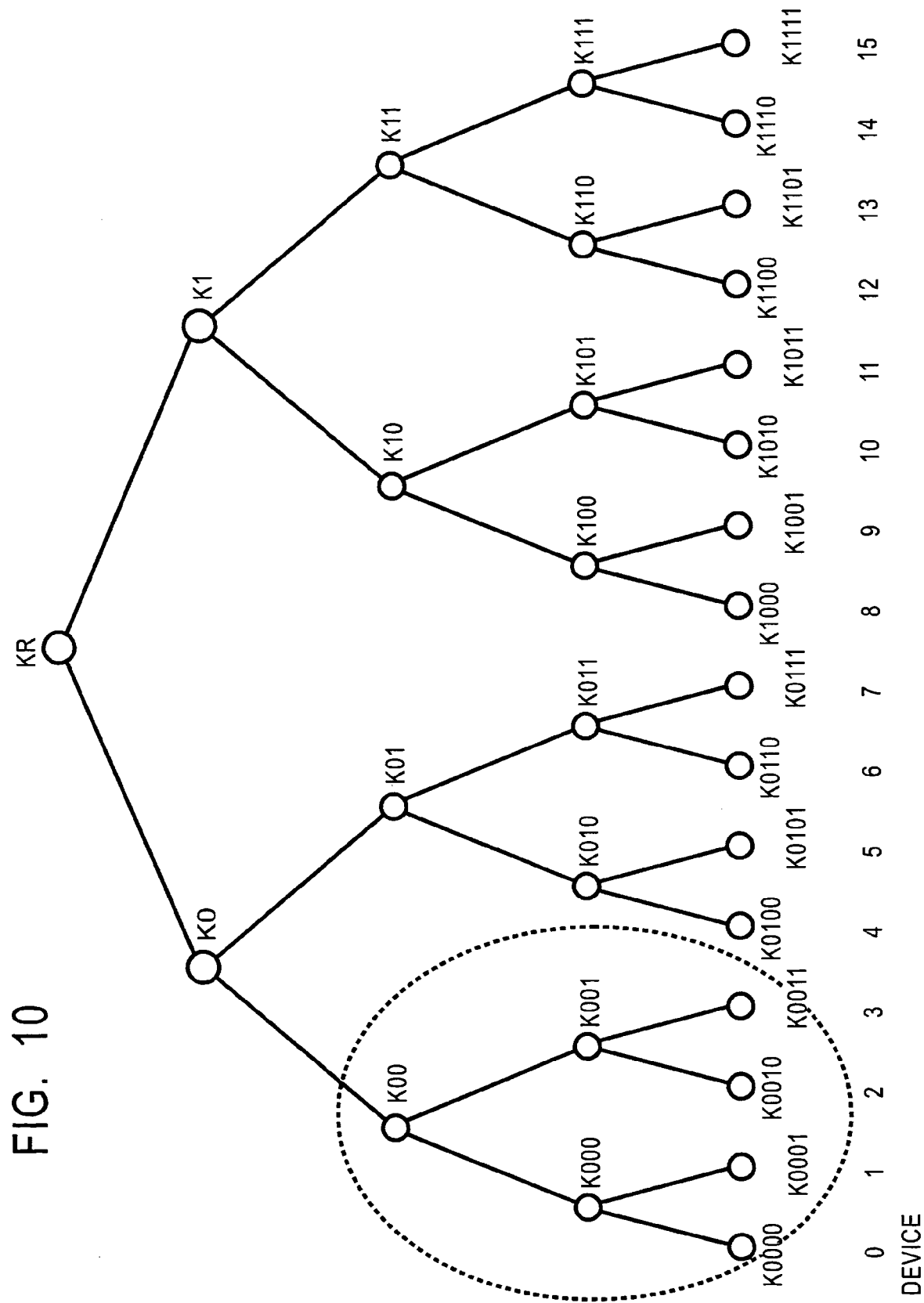
FIG. 10 illustrates the structure of a key.

In accordance with the present invention as shown in FIG. 10, the device and key are managed based on the principle of the broadcast encryption method. The key is arranged in a hierarchical tree structure, in which a leaf at the bottom layer corresponds to the key unique to a corresponding device. The management of the hierarchical tree structure key used in the system of the present invention is disclosed in Japanese Unexamined Patent Application Publication No. 2001-352321. In the example illustrated in FIG. 10, keys corresponding to 16 devices of number zero through number 15 are generated.

Each key is defined for a respective node at a circle as shown in the tree structure. In this example, a root key KR corresponds to the top-layer root node, keys K0 and K1 correspond to second-layer nodes, keys K00 through K11 correspond to third-layer nodes, keys K000 through K111 correspond to fourth-layer nodes. Keys K0000 through K1111 correspond to the bottom-layer nodes as leaves (device nodes).

In the hierarchical structure, the higher key above the key K0010 and the key 0011 is K001, and the higher key above the key K000 and the key K000 is K00. Similarly, the higher key above the key K00 and the key K01 is K0, and the higher key above the key K0 and the key K1 is KR.

The key to use the content is managed by keys corresponding to nodes of respective paths present from the bottom-layer device node (leaf) to the top-layer root node. For example, in a device corresponding to a leaf of number 3, the key to use the content is managed by each of keys of paths containing keys K0011, K001, K00, K0, and KR.

Figure 11:
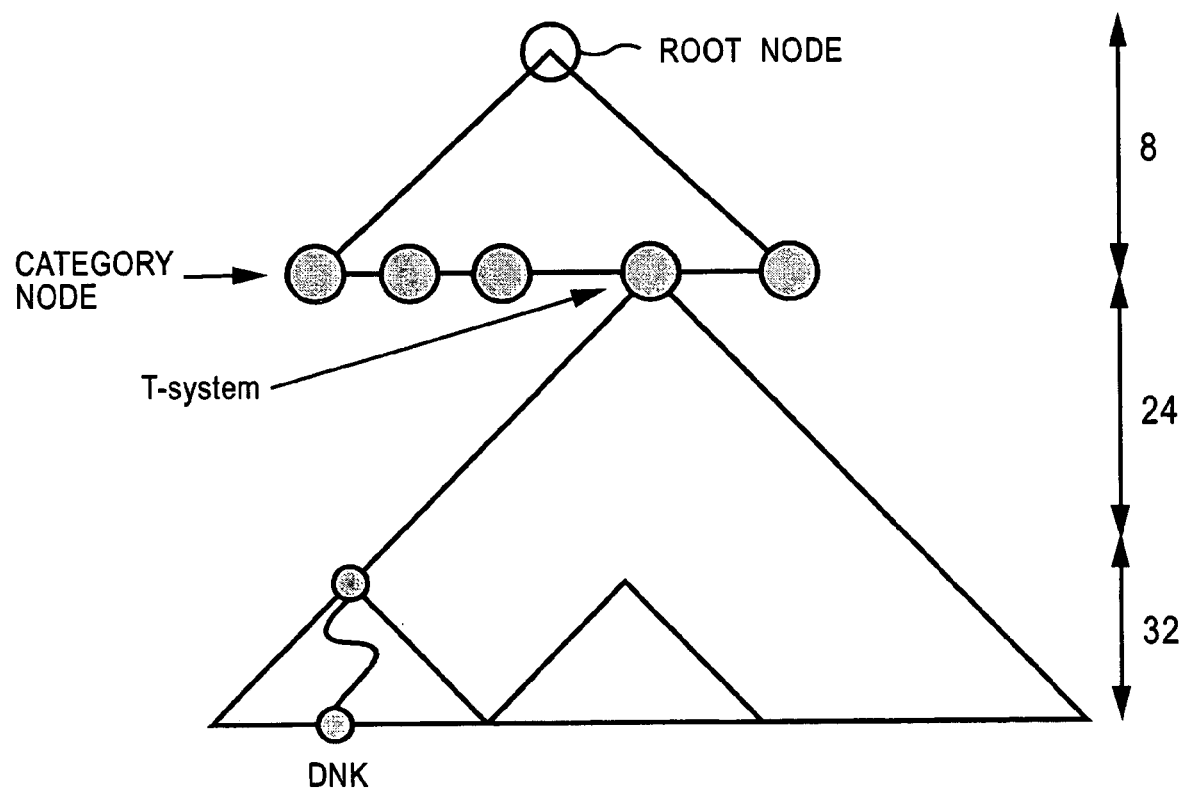
FIG. 11 illustrates a category node.

In the system of the present invention as shown in FIG. 11, a device key and a content key are managed in the key system constructed based on the principle shown in FIG. 10. In the example shown in FIG. 11, nodes at 8+24+32 layers are arranged in a tree structure, and categories are assigned to nodes from the root node down to nodes lower than the root node by 8 layers. Here, the category refers to a category of apparatuses that use a semiconductor memory such as a memory stick, and a category of apparatuses that receive digital broadcasting. The system (referred to as T-system) as a system managing licenses refers to one of category nodes.

Keys corresponding to nodes lower than the node of the T-system by 24 layers are responsible for a service provider or service provided by the service provider. In this case, $2^{24}$ (about 16 mega) service providers or services are defined. At the bottom layer, namely, at the $32^{nd}$ layer, $2^{32}$ (about 4 giga) users (or clients 1) are defined., Keys of the nodes of paths from the nodes at the bottom $32^{nd}$ nodes to the nodes at the T-system form DNKs (device node keys), and IDs corresponding to leaves at the bottom layer are referred to leaf IDs.

The content key into which the content is encrypted is encrypted by an updated root key KR', and an updated node keys at a hierarchically higher layer is encrypted using an update node key immediately therebelow, and is then stored in an EKB (to be discussed later with reference to FIG. 13 and FIG. 14). An updated node key one layer higher than the bottom layer of the EKB is encrypted using a bottom-layer node key or a leaf key in the EKB, and the encrypted key is held in the EKB. Using any key of a DNK described in the service data, the client 1 decrypts the update node key at a hierarchical layer immediately thereabove described in the EKB (FIG. 13 and FIG. 14) distributed together with the content data. Using the decrypted key, the client 1 decrypts an updated node key at a layer immediately thereabove described in the EKB. By performing the above steps repeatedly, the client 1 obtains the updated root key KR'.

Figure 12:
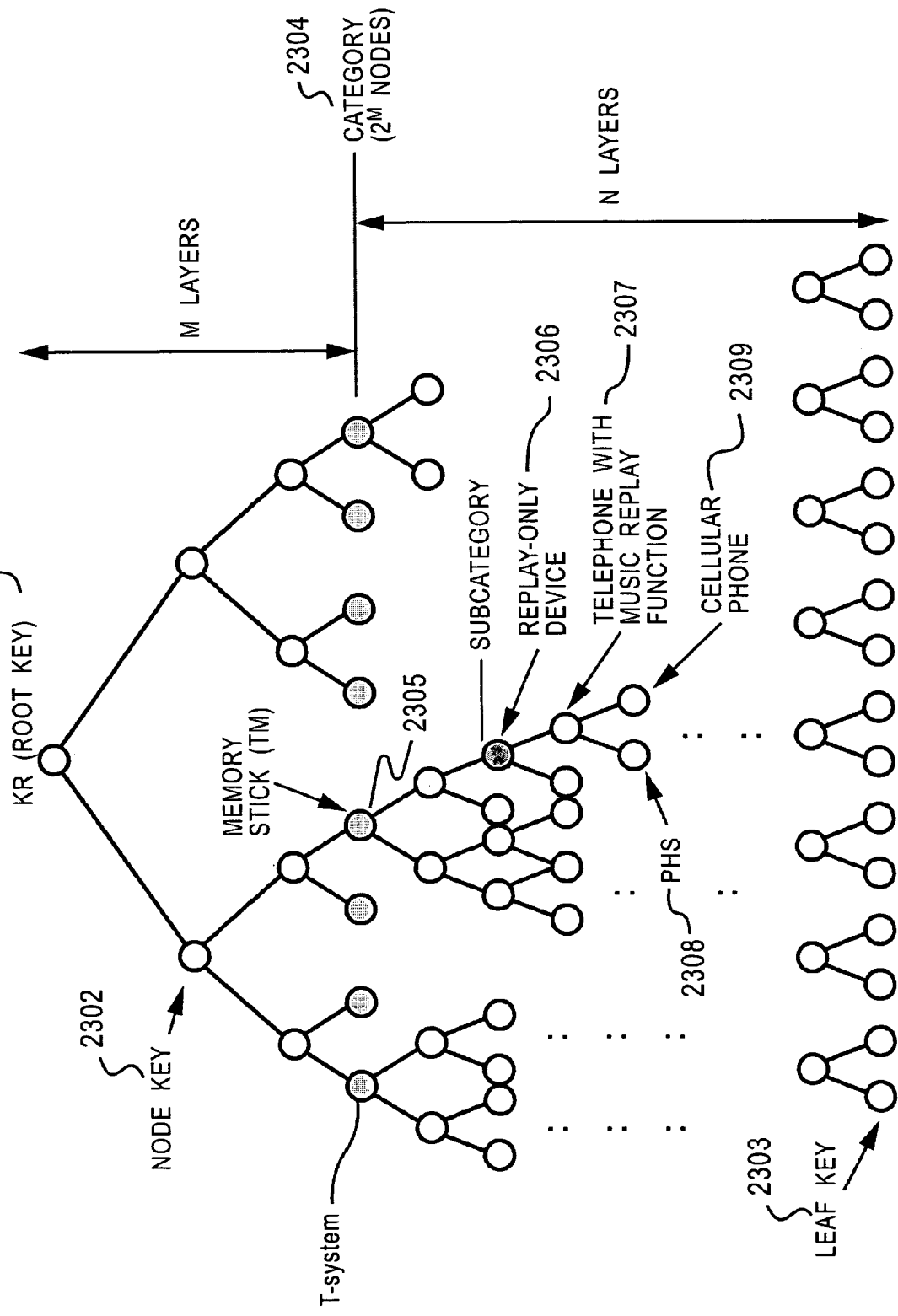
FIG. 12 specifically illustrates the correspondence between a node and a device.

FIG. 12 illustrates specific categories in the hierarchical tree structure. As shown, a root key KR 2301 is set up at the top layer in the hierarchical tree structure, a node key 2302 is set up at an intermediate layer therebelow, and leaf keys 2303 are set up at the bottom layer. Each device holds a respective leaf key, a series of node keys from the leaf key to the root key, and a device node key (DNK) formed of the root key.

Predetermined node keys at a layer M from the top layer (M=8 in the example in FIG. 11) are set up as category nodes 2304. In other words, each of the nodes at the layer M is a device setting node in a particular category. With one node at the layer M at an apex, nodes and leaves at layer M+1 and lower layers, are nodes and leaves relating to devices contained in the category.

For example, a category [memory stick (trademark)] is set at one node 2305 at layer M shown in FIG. 12, and nodes and leaves chained therebelow are set up as nodes and leaves in a dedicated category for a variety of devices employing the memory stick. In other words, the nodes and leaves chained below the node 2305 are defined as a set of nodes and leaves of the devices in the category of the memory stick.

A subcategory node 2306 may be set up at a layer lower than the layer M by several layers. In the example shown in FIG. 12, a node 2306 of [replay only device] is set up as a subcategory, contained in the category of the device using the memory stick, at a layer lower than the [memory stick] node 2305 by two layers. Set up below the replay only device 2306 as a subcategory is a node 2307 for a telephone with a music replay function contained in the category of the replay only device. Set up further below are a [PHS] node 2308 and a [cellular phone] node 2309, contained in the category of the telephone with the music replay function.

The category and subcategory accept the settings for not only the type of devices, but also manufacturers, content providers, nodes independently managed by settlement institutions, namely, units of work, areas of responsibility, units of provided service, and any other unit (these units are collectively referred to as an entity). For example, if one category node is set as an apex node for a game playing machine XYZ sold by a game playing machine manufacturer, the game playing machine XYZ is sold by the manufacture with node keys and leaf keys below the apex node set therewithin. Thereafter, encrypted contents, a variety of keys, and an update process are delivered by generating an enabling key block (EKB) formed of the node keys and leaf keys below the apex node key. Data, which is usable only on the device below the apex node, is thus delivered.

With one node at an apex in this way, the nodes therebelow are set up as an associated node in a category or a subcategory defined by the apex node. A manufacturer, a content provider, etc, managing one apex node at a category layer or a subcategory layer generate an enabling key block (EKB) with that node at the apex on their own, and delivers the content to the device belonging to one of the nodes below the apex node. A key updating is performed without affecting devices belonging to the nodes in another category outside the apex node.

If it is found at a given time point t that keys K0011, K001, K00, K0, and KR owned by a device 3 are analyzed and disclosed by an attacker (hacker), the device 3 must be isolated from a system (a group composed of devices 0, 1, 2, and 3) to protect data. To this end, the node keys K001, K00, K0, and KR must be updated to new keys K(t)001, K(t)00, K(t)0, and K(t)R, respectively, and the devices 0, 1, and 2 must be notified of the updated keys. Here, K(t)aaa means an updated key of a key Kaaa in a generation t.

A delivery process of the updated key is now discussed. The key is updated by supplying the devices 0, 1, and 2 with a table listing block data called enabling key blocks (EKB) shown in FIG. 13 through a network or in a recording medium. The enabling key block (EKB) is formed of encryption keys that are used to distribute newly updated keys to the devices corresponding to the leaves (the bottom layer nodes) forming the tree structure shown in FIG. 10. The enabling key block (EKB) is also referred to as a key renewal block (KRB).

The enabling key block (EKB) shown in FIG. 13 is block data having a data structure in which only a device in need of node key updating can be updated. In the example shown in FIG. 13, the block data is the one that is generated to deliver the updated node keys in the generation t to the devices 0, 1, and 2 in the tree structure shown in FIG. 10. As obviously seen from FIG. 10, the device 0 and the device 1 need K(t)00, K(t)0, and K(t)R as the updated node keys, and the device 2 needs K(t)001, K(t)00, K(t)0, and K(t)R as the updated node keys.

As shown in FIG. 13, the EKB contains a plurality of encryption keys. The encryption key at the bottom layer shown in FIG. 13 is Enc(K0010, K(t)001). This encryption key is an updated node key K(t)001 that has been encrypted by the leaf key K0010 held by the device 2. The device 2 decrypts the encryption key using the leaf key K0010 of its own, thereby obtaining the updated node key K(t)001. Using the updated node key K(t)001 as a result of decryption, an encryption key Enc(K(t)001, K(t)00) at the second layer from the bottom in FIG. 13 is decrypted, thereby resulting in an updated node key K(t)00.

Successively, an encryption key Enc(K(t)00, K(t)0) at the second layer from the top layer in FIG. 13 is decrypted, achieving an updated node key K(t).0. Using the updated node key K(t)0, an encryption key Enc(K(t)0, K(t)R) at the top layer in FIG. 13 is decrypted, thereby resulting in an updated root key K(t)R.

On the other hand, the node key K000 is excluded from the keys to be decrypted. The nodes 0 and 1 need K(t)00, K(t)0, and K(t)R as the updated node keys. Using device keys K0000 and K0001, an encryption key Enc(K000, K(t)00) at the third layer from the top layer in FIG. 13 is decrypted, resulting in an updated node key K(t)00. Successively, an encryption key Enc(K(t)00, K(t)0) at the second layer from the top in FIG. 13 is decrypted, resulting in an updated node key K(t)0. An encryption key Enc(K(t)0, K(t)R) at the top layer in FIG. 13 is decrypted, resulting in an updated root key K(t)R.

An index column in FIG. 13 lists absolute addresses of node keys and leaf keys used as an encryption key to decrypt the encryption key on the right-hand column.

If the node key K(t)0, and K(t)R at the top layer requires no updating but the node key K00 only requires updating in the tree structure shown in FIG. 10, the updated node key K(t)00 is delivered to the devices 0, 1, and 2 using the enabling key block (EKB) shown in FIG. 14.

The EKB shown in FIG. 14 is usable to deliver a new content key shared by a particular group. For example, it is assumed that the devices 0, 1, 2 and 3 uses a certain recording medium in a group enclosed by broken line as shown in FIG. 10 and requires a new and common content key K(t)con. Delivered together with the EKB shown in FIG. 14 is data Enc(K(t)00, K(t)con) into which a new and common updated content key K(t)con is encrypted using a key K(t)00, which is an update of the common node key K00 of the devices 0, 1, 2, and 3. By this delivery, data that cannot be decrypted by a device in another group, such as a device 4, is delivered.

In other words, if the devices 0, 1, and 2 decrypt encrypted data using the key K(t)00 that is obtained by processing the EKB, a content key K(t)con at time point t is achieved.

Figure 15:
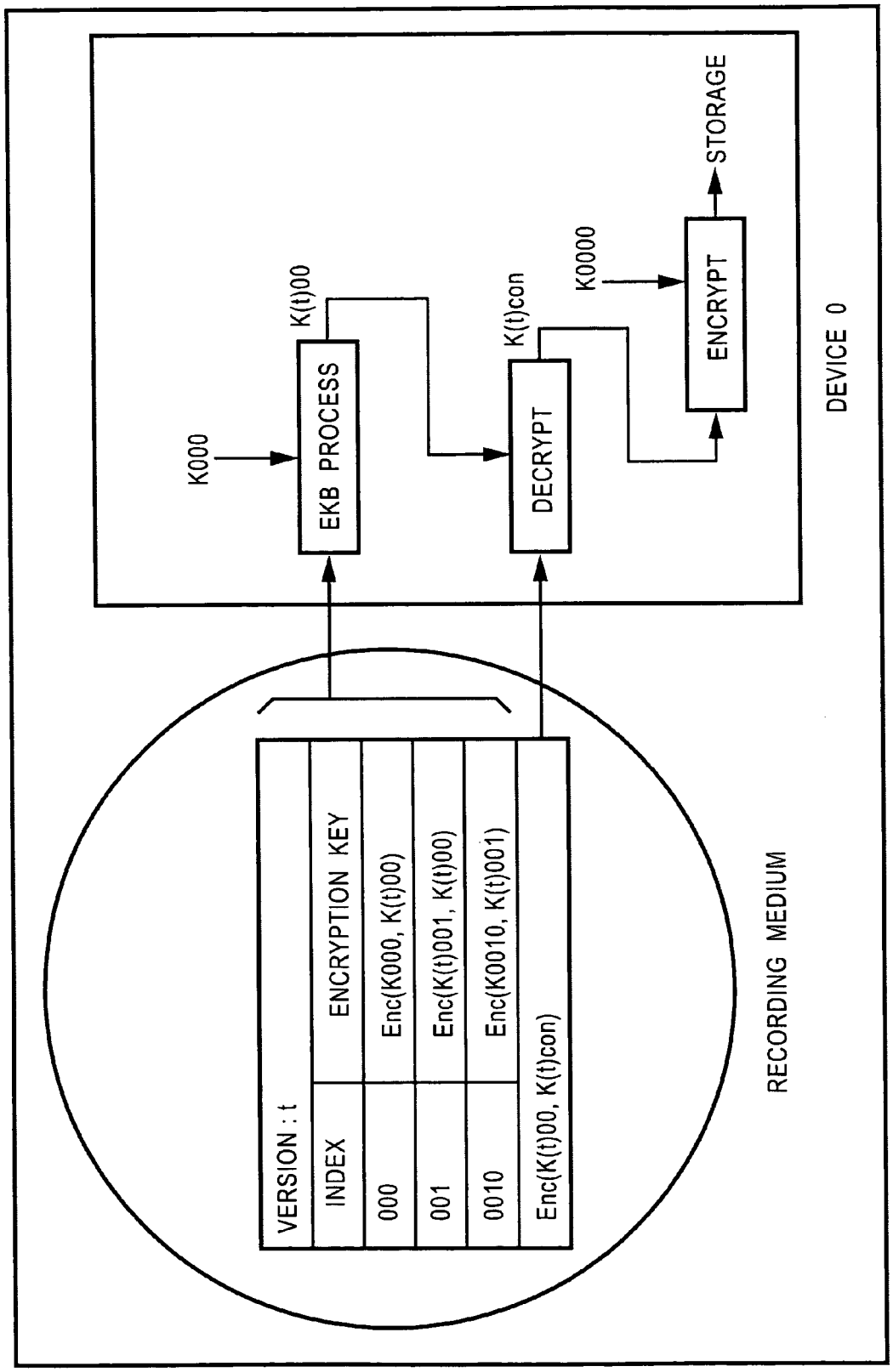
FIG. 15 illustrates the usage of the enabling key block.

FIG. 15 shows a processing of a content key K(t)con at time point t, in other words, FIG. 15 shows the data Enc(K(t)00, K(t)con) that results from decrypting the new and common content key K(t)con using the K(t)00 and a process of the device 0 receiving the EKB shown in FIG. 14 through a recording medium. More specifically, message data encrypted by the EKB is the content key K(t)con in this example.

As shown in FIG. 15, the device 0 generates the node key K(t)00 in the same EKB process, as already described, using the EKB in the generation t stored in the recording medium and the node key K000 stored beforehand therewithin. Furthermore, the device 0 decrypts the updated content key K(t) con using the decrypted updated node key K(t)00, and encrypts the decrypted content key K(t)con with the leaf key K0000, which is owned by the device 0 only, and stores the encrypted content key K(t)con for later use.

Figure 16:
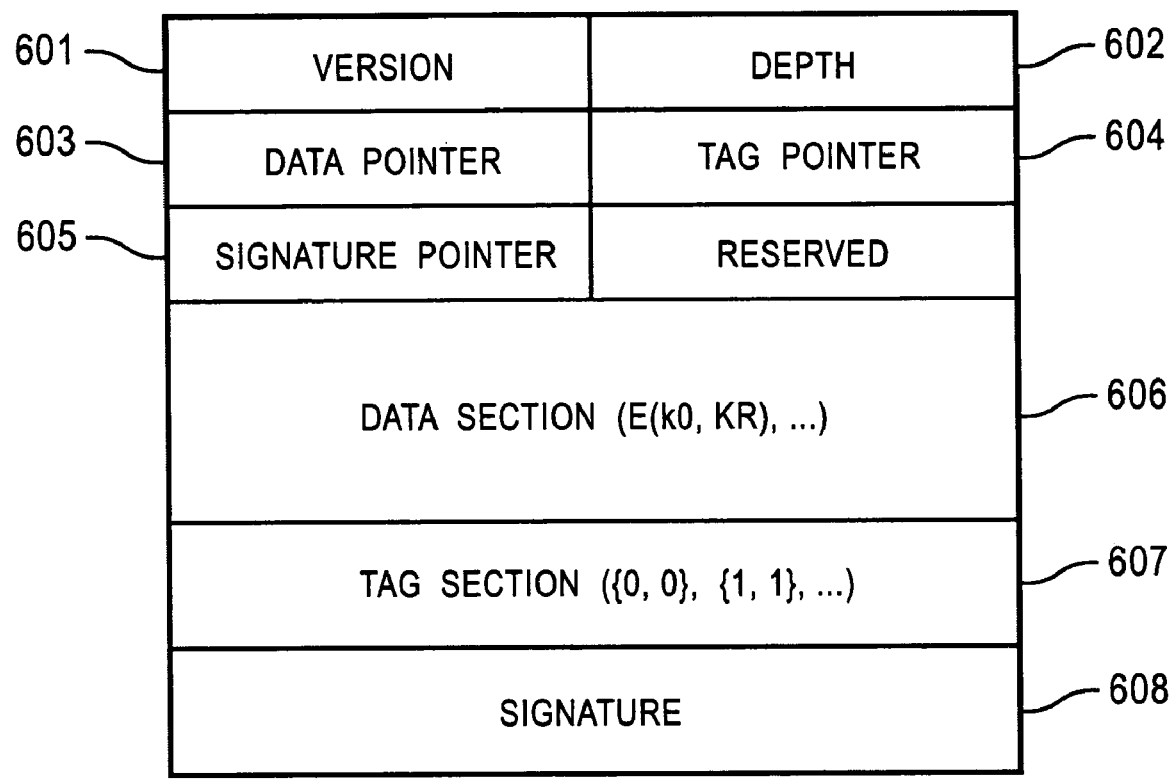
FIG. 16 illustrates an example of a format of the enabling key block.

FIG. 16 illustrates a format of an enabling key block (EKB). A version 601 is an identifier indicating the version of the enabling key block (EKB). The version has the function of identifying the latest EKB, and the function of specifying a correspondence with the content. A depth indicates the number of layers in a hierarchical tree of a device as a destination of an enabling key block (EKB). A data pointer 603 points to the position of a data section 606 in the enabling key block (EKB), a tag pointer 604 points to the position of a tag section 607, and a signature pointer 605 points to the position of a signature 608.

The data section 606 stores data into which a node key to be updated is encrypted. For example, each encryption key and the like relating to an updated node key are stored as shown in FIG. 15.

The tag section 607 is a tag representing the positional relationship of encrypted node keys and encrypted leaf keys stored in the data section 606. A tag attachment rule is discussed with reference to FIG. 18.

Figure 17:
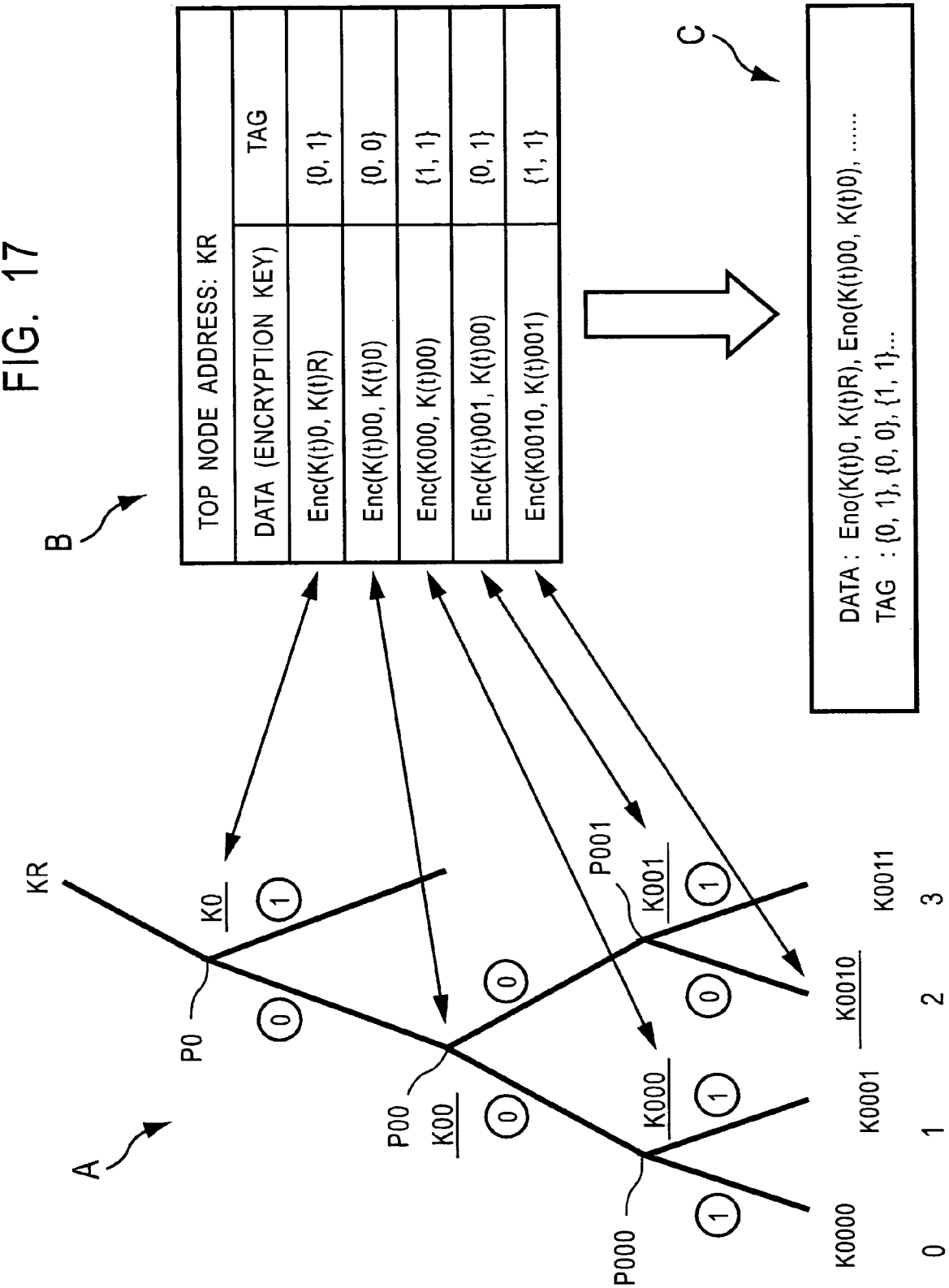
FIG. 17 illustrates the structure of a tag of the enabling key block.

FIG. 17 shows a process in which the enabling key block (EKB) already discussed with reference to FIG. 13 is sent as data. The data then is a list represented by the letter B in FIG. 17. The address of the top node contained in the encryption key is referred to as a top node address. Since the updated key K(t)R of the root key is contained in this example, the top node address is KR. Data Enc(K(t)0, K(t)R) at the top layer corresponds to a position P0 in the hierarchical tree shown by the letter A in FIG. 17. Data at the next layer is Enc(K(t)00, K(t)0), and corresponds to a position P00 at the left of and below the preceding data in the tree structure. When viewed from a predetermined position in the tree structure, the tag is set to 0 if data is present below the predetermined position, and the tag is set to 1 if data is not present below the predetermined position. The tag is set as {left(L) tat, right(R) tag}. Since data is present at the position P00 at the left of and below the position P0 corresponding to the data Enc(K(t)0, K(t)R) at the top layer in the table B, the L tag=0. Since there is no data on the right hand side, the R tag=1. Tags are attached to all pieces of data, and a data string and a tag string are organized as shown by the letter C in FIG. 17.

The tag is set in order to point to the position where the corresponding data Enc(Kxxx, Kyyy) is located in the tree structure. Although the key data Enc(Kxxx, Kyyy) . . . stored in the data section 606 is a simple arrangement of data of keys without any regularity, the above-referenced tag allows the encrypted key stored as the data to be positioned in the tree. Instead of using the above-referenced tag, the node index corresponding to the encrypted data in the arrangement already discussed with reference to FIG. 15 may be used. For example, 0: Enc(K(t)0, K(t)R)
00: Enc(K(t)00, K(t)0)
000: Enc(K((t)000, K(t)00)
. . .

may be arranged as a data structure. With such an index structure, the data becomes redundant, and the amount of data substantially increases. The increased amount of data is not preferable in the delivery and other process using the network. In contrast, the use of the above-referenced tag as index data determines the position of each key with a small amount data.

Returning to FIG. 16, the EKB format is further discussed. The signature 608 is an electronic signature that is performed by a key management center (the license server 4), a content provider (the content server 3), a settlement institution (the accounting server 5), etc. A device having received the EKB, verifies that the received EKB is an enabling key block (EKB) an authentic enabling key block (EKB) issuer has issued through a signature verification procedure.

The content supplied from the content server 3 is used based on the right of use supplied from the license server 4 as described above. The process of using the content is summarized as shown in FIG. 18.

The content is provided to the client 1 from the content server 3 while the license server 4 grants a license to the client 1. The license refers to a combination of service data that is supplied when the client 1 is registered in the license server 4, and the right of use that is information for permitting the use of a particular content. The content is encrypted with the content key Kc (to Enc(Kc, Content)). The content key Kc is encrypted with an updated root key KR' (the key resulting from the EKB, and corresponding to the key $K_{EKBC}$ in FIG. 5) (to Enc (KR', Kc)) The encrypted data Enc(KR', Kc) together with the EKB is attached to the encrypted content. The client 1 is thus provided with the encrypted data Enc(KR', Kc) and the encrypted content.

Figure 18:
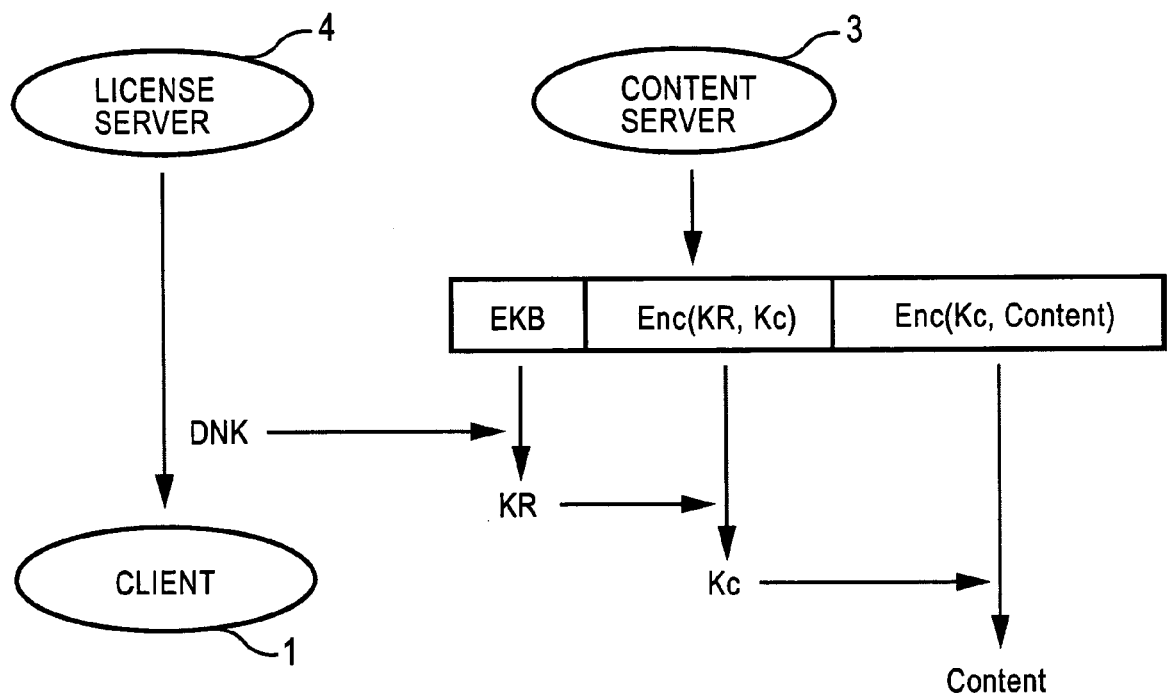
FIG. 18 illustrates a decryption process of a content using a DNK.
Figure 19:
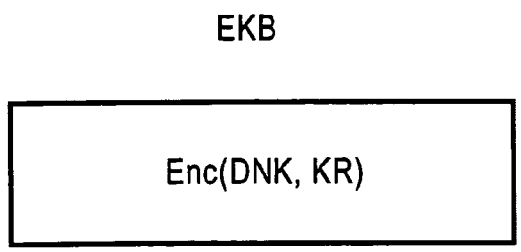
FIG. 19 illustrates an example of the enabling key block.

The EKB in the example shown in FIG. 18 contains the updated root key KR' decryptable with the DNK(Enc(DNK, KR')) as shown in FIG. 19. The client 1 acquires the updated root key KR' from the EKB using the DNK contained in the service data. The client 1 further decrypts the Enc(KR', Kc) into the content key Kc using the updated root key KR', and then decrypts Enc(Kc, Content) into the content using the content key Kc.

Each client 1 is revoked by assigning a DNK to each device in accordance with the principle discussed with reference to FIG. 10 and FIG. 15.

By attaching license leaf ID to the content before delivery, the service data is associated with the right of use in the client 1. An authorized copying of the right of use is thus prevented.

By delivering the certificate for the client and the private key as the service data, an end user can produce a content that is free from an authorized copying.

In accordance with the present invention as already discussed with reference to FIG. 11, the category node is associated with the T-system managing the license and the category of the device using a variety of contents. The same device thus holds a plurality DNKs. As a result, a single device can manage different categories.

Figure 20:
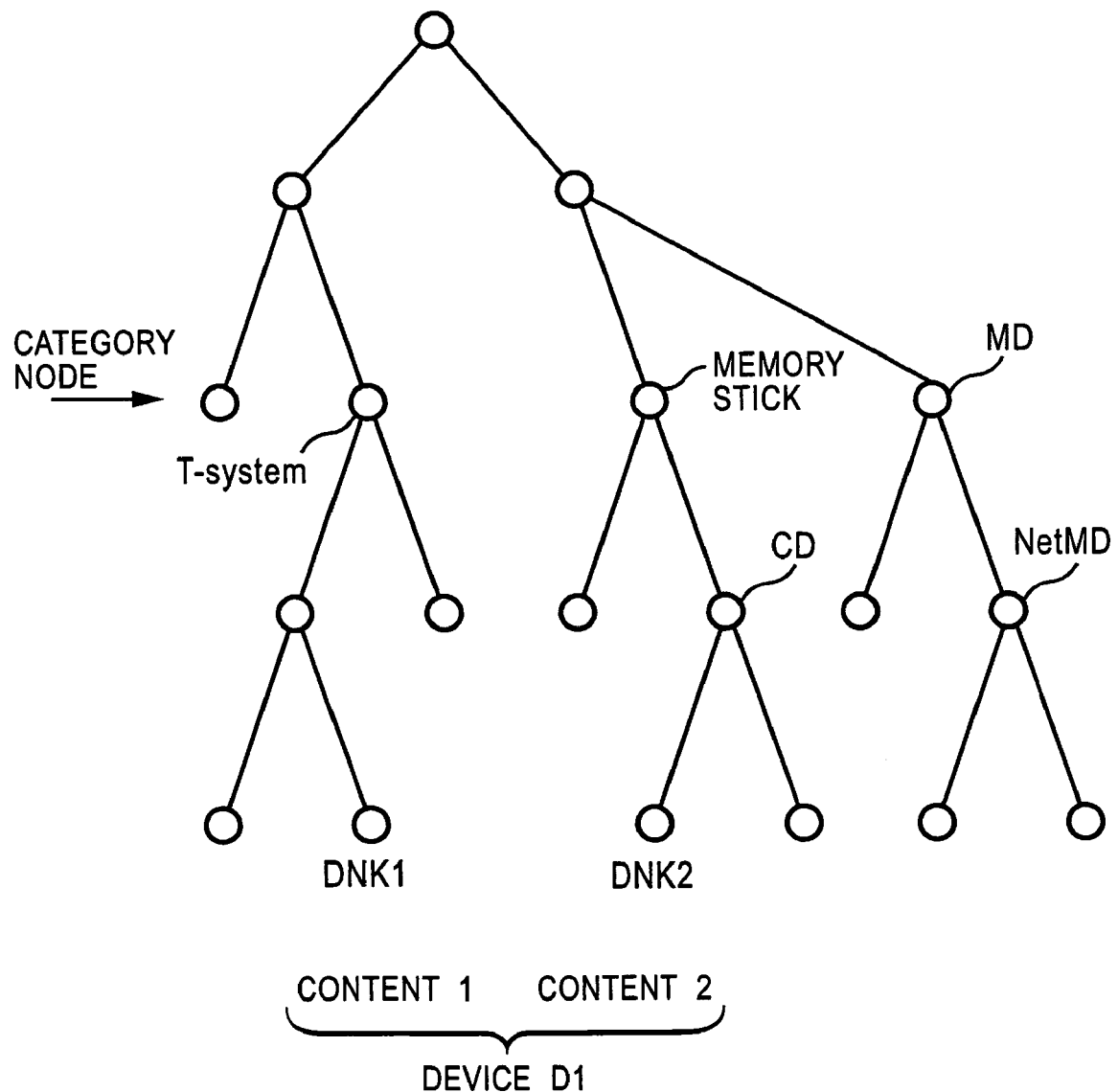
FIG. 20 is a diagram illustrating an assignment of a plurality of contents to a single device.

FIG. 20 shows such a relationship. More specifically, a device D1 is assigned a DNK 1 in accordance with the T-system, and reproduces a content 1 containing the EKB. Similarly, the device D1 is assigned a DNK 2, for example, and records, on a memory stick, a content 2 ripped from a CD. In this case, the device D1 can concurrently handle the content 1 and the content 2, delivered from different systems (the T-system and device management system). Such an operation is impossible if a device works with a single DNK, because when the device is assigned a new DNK, an already assigned DNK must be deleted, for example.

The present invention thus allows the key management to be performed in one category independent of another.

Rather than being embedded in devices and media, a DNK is downloaded to devices or media when the license server 4 performs a registration process. The present invention thus achieves a system in which the user is permitted to purchase a key.

A content and the right of use of the content may be separately distributed in a system. In such a system, the content, after being produced, preferably remains always usable in all services regardless of usage thereof. For example, the same content is preferably used even in different content delivery services or in different services. As already discussed, the license server 4 as an authenticator distributes a private key and a certificate of a corresponding public key to each user (the client 1). Using the private key, each user produces a signature, and attaches the signature to a content, thereby guaranteeing the integrity of the content and preventing the counterfeiting of the content.

Discussed next are an export process of exporting a content from the client 1 to a memory stick (trademark), which is a secure medium mounted in the client 1 and one example of a content storage device, and an import process for importing a content from the memory stick to the client 1.

The import and export processes include the transfer, the copying, and the checkout of a content, and are assigned to a node lower than the T-system node as one category as shown in FIG. 12.

Figure 21:
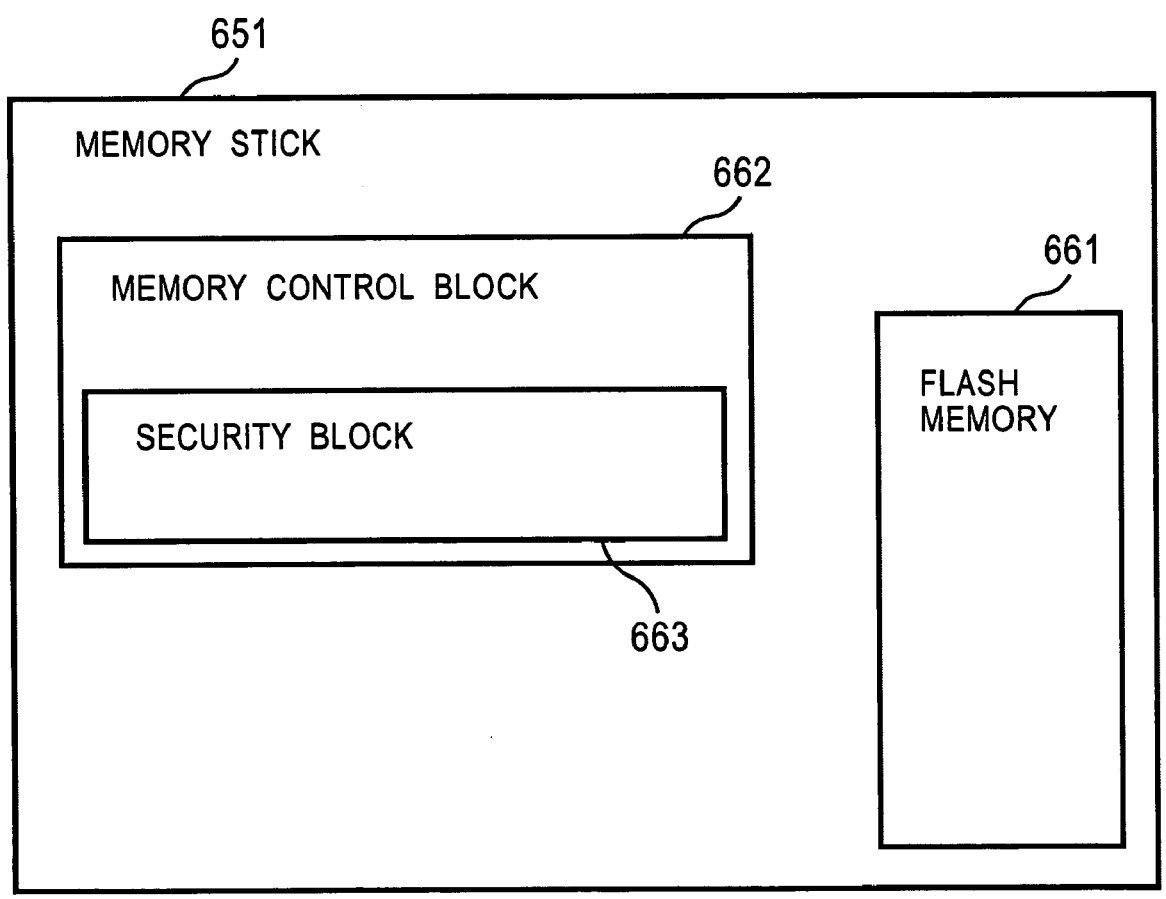
FIG. 21 is a block diagram illustrating the structure of a memory stick.

FIG. 21 shows the structure of the memory stick. The memory stick 651 is one chip IC into which a flash memory (a non-volatile memory) 661, a memory control block 662, and a security block 663 including a DES (Data Encryption Standard) encryption circuit are integrated.

A content is encrypted under the control of the memory control block 662, and the encrypted content is then stored in the flash memory 661.

The memory control block 662 performs a serial/parallel conversion, or a parallel/serial conversion, while separating commands from supplied data, and executing the separated commands. The memory control block 662 causes the flash memory 661 to store the content in response to the supplied command, or reads a content stored in the flash memory 661.

The security block 663 in the memory stick 651 stores a plurality of authentication keys and a storage key unique to each memory card. The security block 663, having a random number generating circuit, and the client 1 mutually authenticate each other, and then share a session key in common.

The security block 663 stores an index including conditions of use to be discussed later, and a MAC value.

The security block 663 decrypts an encrypted content under the control of the memory control block 662.

Figure 22:
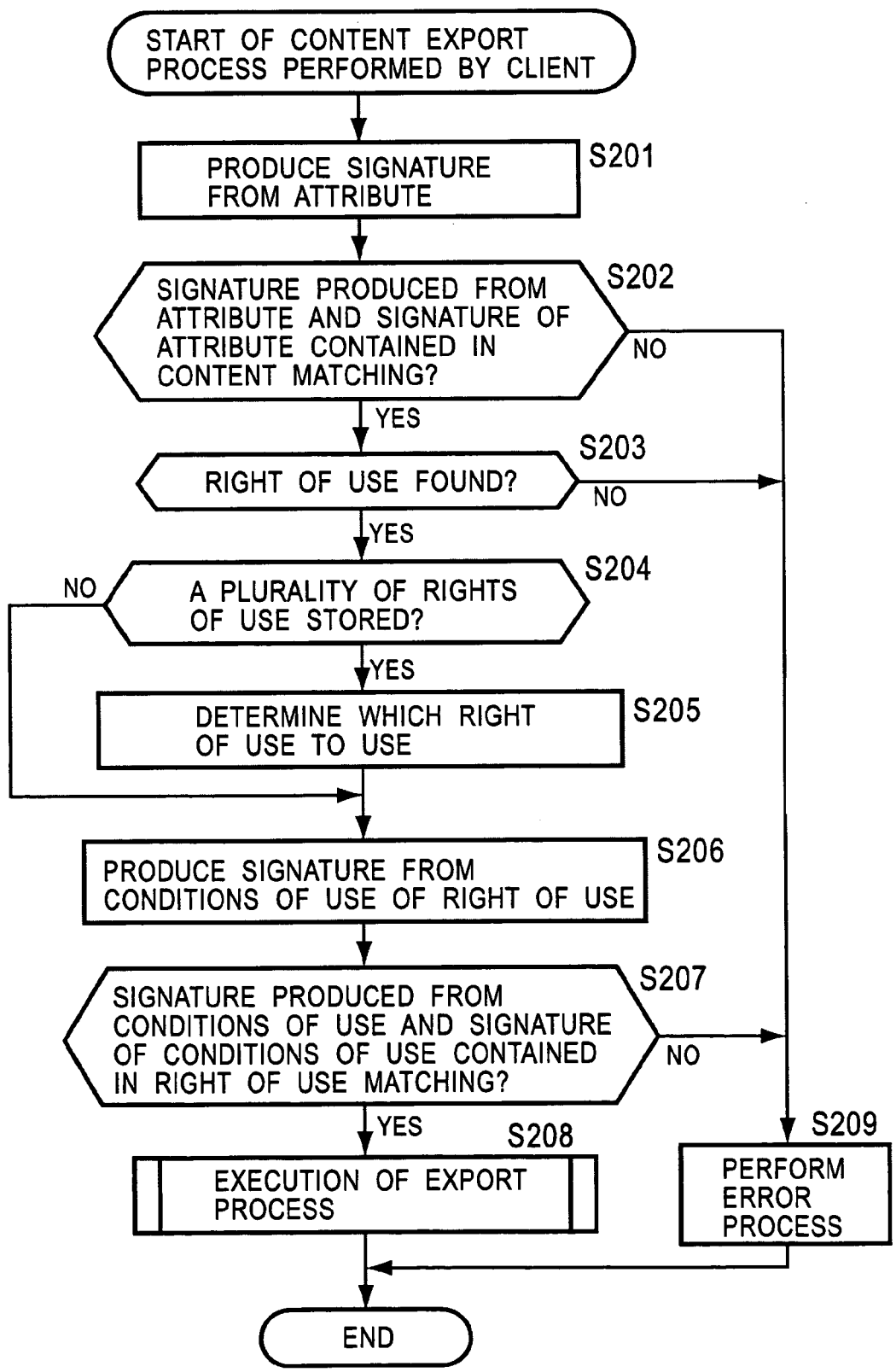
FIG. 22 is a flow diagram illustrating an export process of a content.

FIG. 22 is a flow diagram illustrating the export process of the client 1 for exporting the content.

In step S201, the CPU 21 in the client 1 selects a content to be exported, and produces a signature from an attribute contained in the selected content.

For example, the CPU 21 in the client 1 produces the signature by encrypting the attribute contained in the content with a public key of the license server contained in the certificate.

In step S202, the CPU 21 in the client 1 compares the produced signature of the attribute with the signature of the attribute contained in the content. If the CPU 21 determines the produced signature of the attribute matches the signature of the attribute contained in the content, the attribute is not counterfeit. The algorithm proceeds to step S203.

If it is determined in step S202 that the produced signature of the attribute fails to match the signature of the attribute contained in the content, the attribute may be counterfeit. The algorithm proceeds to step S209. The CPU 21 in the client 1 performs an error process such as displaying an error indicator. The export process ends without being completed.

In step S203, the CPU 21 in the client 1 searches the storage 28 for a right of use which permits the export process and contains content conditions the attribute of a target content satisfies. If the right of use required to use the target content is not found in the storage 28, the algorithm proceeds to step S209. The CPU 21 in the client 1 performs an error process such as displaying an error indicator. The export process ends without being completed.

If the right of use required to use the content is found in step S203, the algorithm proceeds to step S204. The CPU 21 in the client 1 determines whether the storage 28 stores a single right of use or a plurality of rights of use required to use the content.

If it is determined that the storage 28 stores a plurality of rights of use required to use the content, the algorithm proceeds to step S205. The CPU 21 in the client 1 causes the display of the output unit 27 to display information such as the conditions of use of each right of use, and allows the user to confirm which right of use to use. The conditions of use of the confirmed right of use are used as the conditions of use of the exported content. The CPU 21 thus determines which right of use to use for the export process based on the input on the input unit 26 by the user.

The selection of the right of use in step S205 is performed not only by the user, but performed in accordance with a priority order based on a predetermined rule.

If it is determined that the storage 28 stores a single right of use required to use the content, the right of use to be used for the export process is already determined. The selection of the right of use in step S205 is not performed and the algorithm proceeds to step S206.

After the selection of the right of use required to use the content is performed, the CPU 21 in the client 1 produces the signature from the conditions of use of the right of use in step S206.

For example, the CPU 21 in the client 1 produces the signature by encrypting the condition of use contained in the right of use with the public key of the license server contained in the certificate.

In step S207, the CPU 21 in the client 1 compares the produced signature of the conditions of use with the signature of the conditions of use contained in the right of use. If the CPU 21 in the client 1 determines that the produced signature of the conditions of use matches the signature of the conditions of use contained in the right of use, the conditions of use are not counterfeit. The algorithm proceeds to step S208. The CPU 21 in the client 1 ends the export process in step S208. The export process is then completed.

If it is determined in step S207 that the produced signature of the attribute fails to match the signature of the attribute contained in the content, the attribute may be counterfeit. The algorithm proceeds to step S209. The CPU 21 in the client 1 executes an error process such as displaying an error indicator. The export process ends without being completed.

Figure 23:
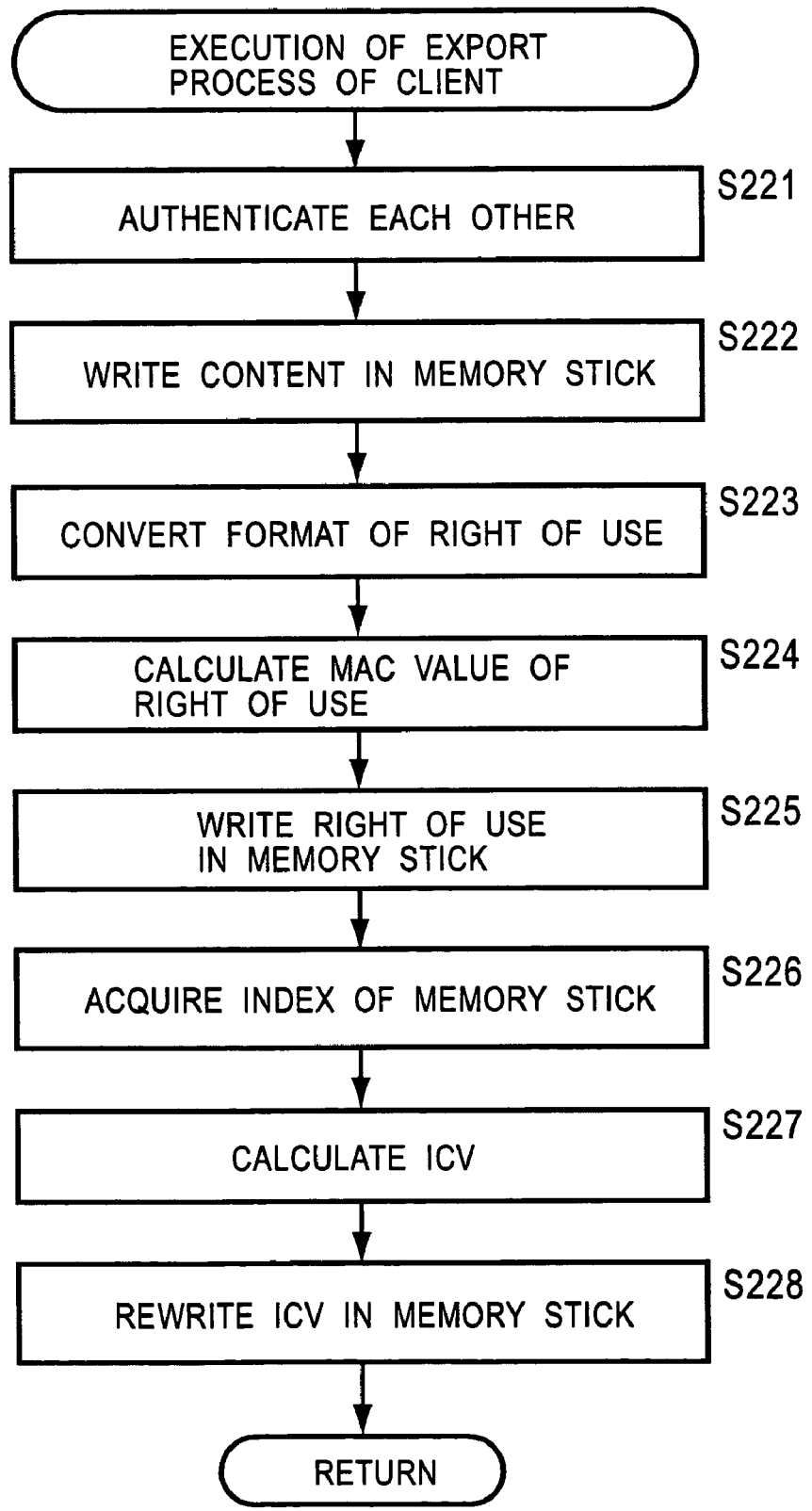
FIG. 23 is a flow diagram illustrating a process of the client for performing an export process.

FIG. 23 is a flow diagram of an export process of the client 1 corresponding to the process in step S208.

In step S221, the CPU 21 in the client 1 and the mounted memory stick authenticate each other. For example, the CPU 21 in the client 1 and the security block 663 in the memory stick 651 perform a mutual authentication process in a challenge and response method.

If the CPU 21 in the client 1 and the security block 663 fail to authenticate each other in step S221, the client 1 or the memory stick 651 may not be authentic. Steps S222 through S228 are skipped, and the process ends without writing the content onto the memory stick 651.

If the mutual authentication process is successfully completed in the process in step S221, the client 1 and the memory stick 651 are authentic. The client 1 and the memory stick 651 share a common one-time key (session key), and processes in steps S222 through S228 are carried out.

In the following process in which a common one-time key (a session key) is shared, information the client 1 transfers to the memory stick 651 is encrypted with the one-time key by the encryptor/decryptor 24. Information the client 1 receives from the memory stick 651 is the one encrypted with the one-time key, and the encryptor/decryptor 24 decrypts the information.

In step S222, the CPU 21 in the client 1 writes the content onto the memory stick 651. For example, the CPU 21 in the client 1 acquires the content key of the memory stick 651 from the memory stick 651, re-keys the content with the content key of the memory stick 651 (encrypts the content with the content key of the memory stick 651), and then provides the memory stick 651 with the content that has been re-keyed with the content key of the memory stick 651.

Optionally, the memory stick 651 may re-key the content.

In step S223, the CPU 21, in the client 1 converts the format of the conditions of use of the right of use into the one compatible with the memory stick.

In step S224, the CPU 21 in the client 1 causes the encryptor/decryptor 24 to calculate a message authentication code (MAC)(hereinafter referred to as MAC) of the conditions of use of the right of use.

Figure 24:
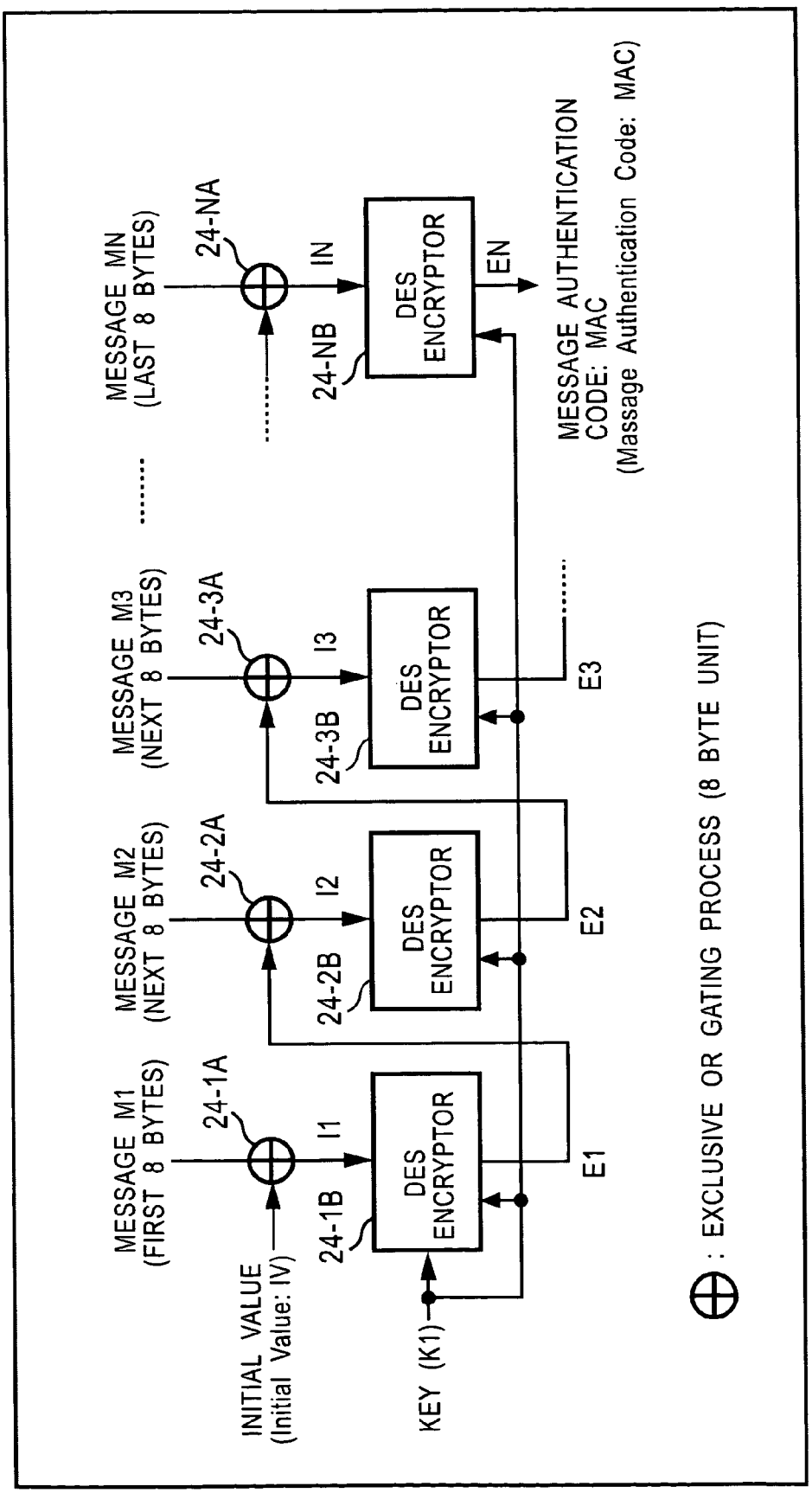
FIG. 24 illustrates the generation of a MAC value in which a DES encryption process mechanism is used.

FIG. 24 illustrates the example of the MAC which is generated using a DES encryption processing mechanism. A target message (conditions of use) is divided on a per 8 byte unit basis as shown in FIG. 24 (thereafter, divided messages are referred to as M1, M2, . . . , MN). An initial value (IV) and M1 are exclusive-OR gated using a logic unit 24-1A (the result of exclusive-OR gating is referred to as I1). The result I1 is input to a DES encryptor 24-1B. The DES encryptor 24-1B encrypts the I1 using a key (hereinafter referred to as K1) (the output of the DES encryptor 24-1B is referred to as E1). A logic unit 24-2A exclusive-OR gates E1 and M2, thereby outputting an output I2. The output I2 is supplied to a DES encryptor 24-2B. The DES encryptor 24-2B encrypts the signal I2 using the key K1 (into an output E2). This series of steps are repeated thereafter to perform the encryption process on all messages. An EN finally output from a DES encryptor 24-NB becomes a message authentication code (MAC).

In step S225, the CPU 21 in the client 1 writes, in the index of the memory stick 651, the conditions of use the format of which has been converted in the process in step S223, together with the MAC value calculated in the process in step S224.

Figure 25:
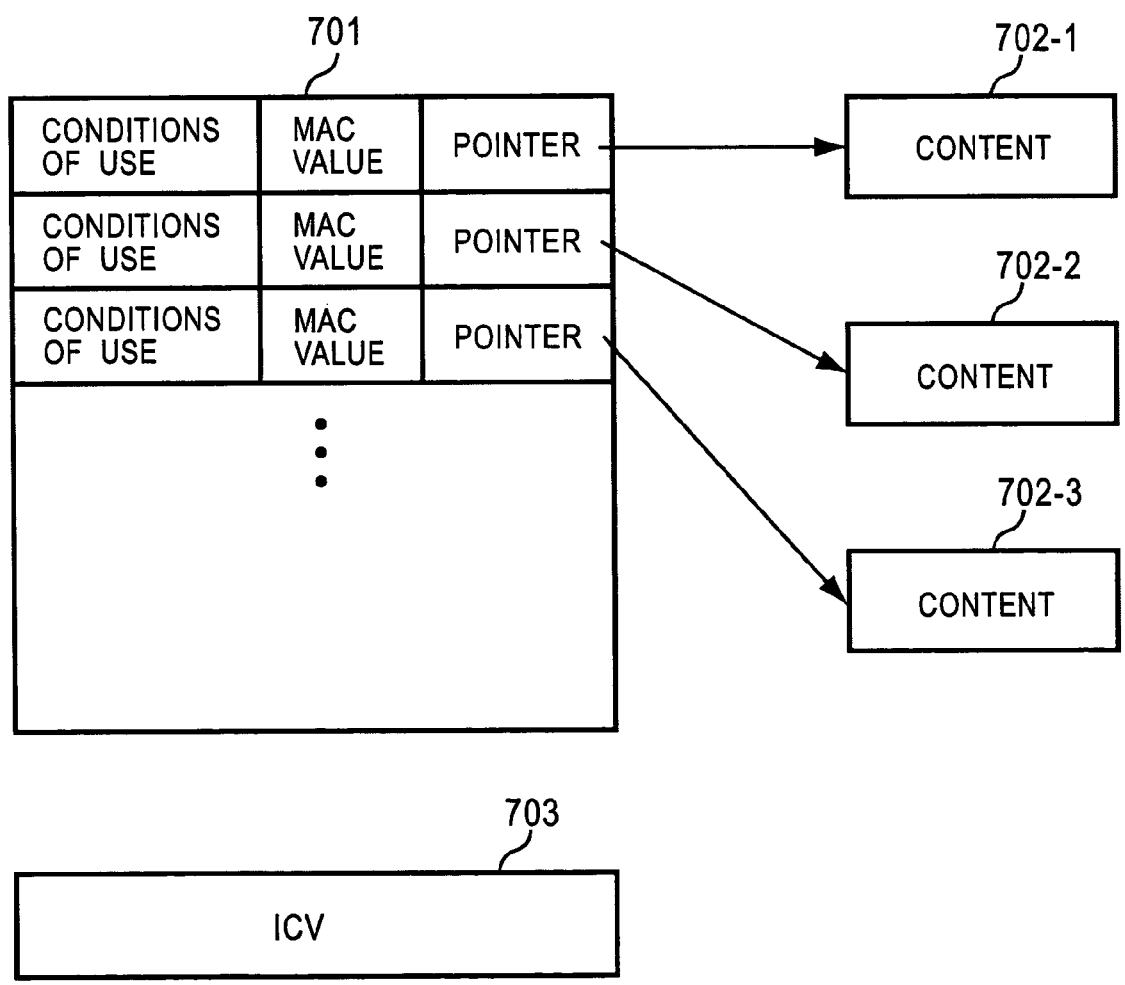
FIG. 25 illustrates an index and content stored in the memory stick.

FIG. 25 illustrates the index and the content stored in the memory stick 651.

The index 701 of the memory stick 651 holds the conditions of use of the content, the MAC value, and a pointer according to the content. The pointer of the index 701 holds an address of the content.

For example, the pointer indicating a content 702-1 stored in the memory stick 651 is stored in the index 701, together with the conditions of use and the MAC value of the content 702-1. A pointer indicating a content 702-2 stored in the memory stick 651 is stored in the index 701, together with the conditions of use and the MAC value of the content 702-2. A pointer indicating a content 702-3 stored in the memory stick 651 is stored in the index 701, together with the conditions of use and the MAC value of the content 702-3.

In step S226, the CPU 21 in the client 1 captures, from the memory stick 651, the index 701 on which the conditions of use and the MAC value are written in the process in step S225.

In step S227, the CPU 21 in the client 1 calculates the integrity check value (ICV) of the entire memory stick 651, based on the index 701 on which the conditions of use and the MAC value are newly written.

The integrity check value of the index 701 is calculated using the hash function to the index 701 in accordance with ICV=hash (Kicv, L1, L2, ... ). Kicv is an ICV generating key. L1 and L2 are information of the conditions of use, and the MAC values of the conditions of use are used as L1 and L2.

In step S228, the CPU 21 in the client 1 rewrites the integrity check value of the memory stick 651 with the calculated integrity check value, and the process ends.

For example, the CPU 21 in the client 1 calculates the integrity check values based on the MAC values corresponding to the contents 702-1 through 702-3 contained in the index 701 captured from the memory stick 651.

As shown in FIG. 25, the CPU 21 in the client 1 writes the calculated integrity check value 703 onto the memory stick 651.

The client 1 transfers the integrity check value to the memory stick 651 through a so-called SAC (Secure Authentication Channel) through which the integrity check value, encrypted with the one-time key, is transmitted to the memory stick 651.

In this way, the integrity check value 703 corresponding to the index 701 is safely stored in the memory stick.

The ICV generated based on the index 701 during the content replay period is compared with the ICV 703 generated based on the conditions of use. If the two ICVs match each other, the conditions of use are not counterfeit. If the two ICVs are different, the conditions of use are determined as being counterfeit.

Figure 26:
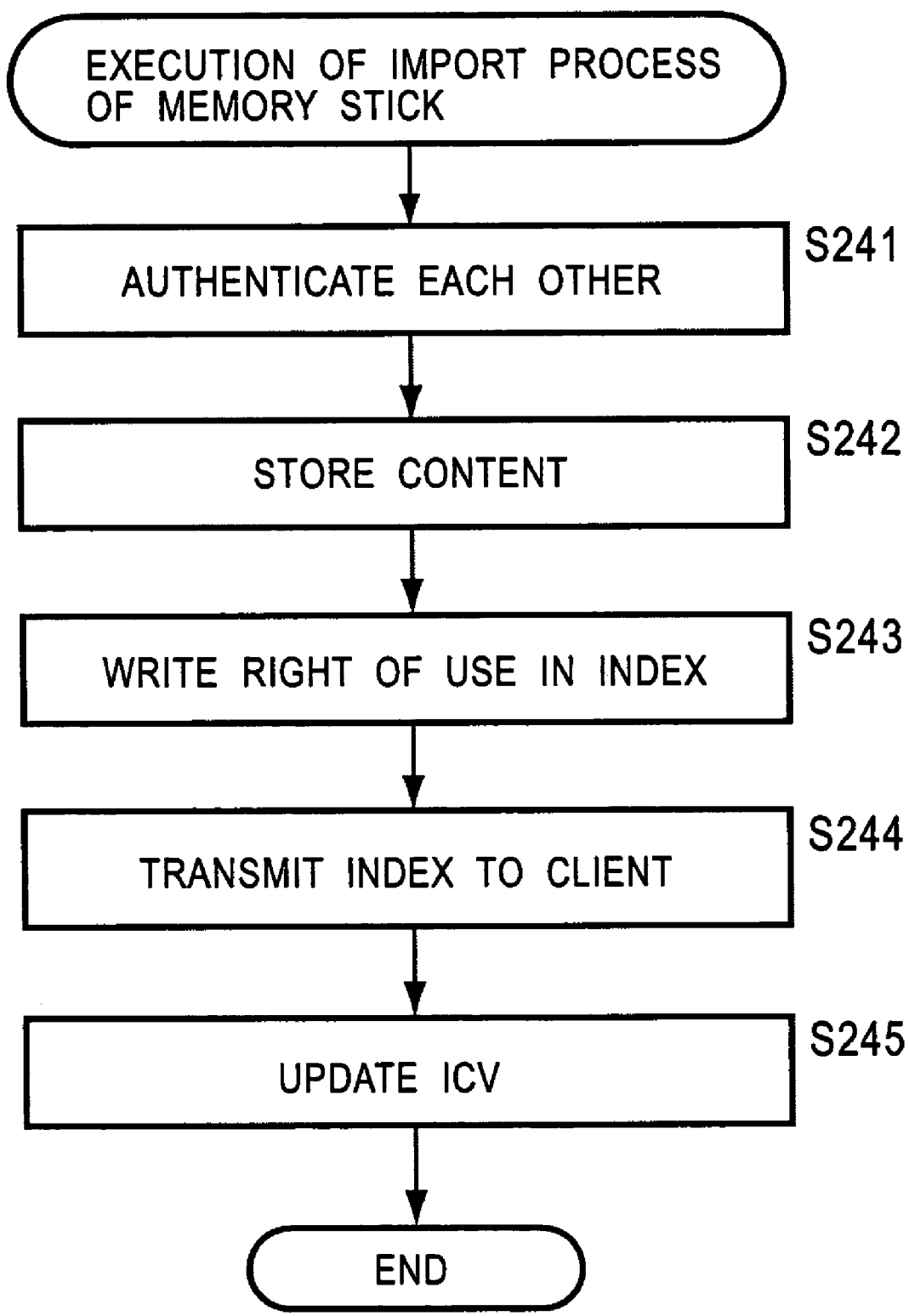
FIG. 26 is a flow diagram illustrating an import execution process of the memory stick.

The import process of the memory stick 651 in response to the export process of the client 1 shown in FIG. 23 will now be discussed with reference to a flow diagram shown in FIG. 26.

In step S241, the security block 663 of the memory stick 651 performs a mutual authentication process with the client 1 in response to the process of the client 1 in step S221.

After the security block 663 and the client 1 have mutually authenticated each other, a common one-time key (a session key) is shared by the client 1 and the memory stick 651.

In the following process where the common one-time key (the session key) is shared, information the memory stick 651 transfers to the client 1 is encrypted with the one-time key by the security block 663. Information the memory stick 651 has received from the client 1 is the one encrypted with the one-time key, and the security block 663 of the memory stick 651 decrypts the encrypted information with the one-time key.

In step S242, the memory control block 662 of the memory stick 651 receives the content that has been transmitted by the client 1 performing step S222, and then causes the flash memory 661 to store the content.

In step S243, the memory control block 662 of the memory stick 651 receives the conditions of use in a converted format that have been transmitted from the client 1 performing the process in step S225, and writes the received conditions of use onto the index 701 of the security block 663. In accordance with the conditions of use, the memory stick 651 writes the pointer indicating the content stored in the process in step S242 onto the index 701 of the security block 663.

After the process in step S243, the conditions of use and the MAC value of the newly stored content, and the pointer indicating the content are stored on the index 701

In response to a request from the client 1, the memory control block 662 of the memory stick 651 reads the index 701 from the security block 663 and transmits the read index 701 to the client in step S244. By receiving the index 701 transmitted in the process in step S244, the client 1 acquires the index 701 in the process in step S226.

In step S245, the memory stick 651 receives the new ICV that has been transmitted from the client 1 performing the process in step S228, and updates the ICV based on the received ICV. The process then ends.

The signature resulting from the public key encryption as the integrity information is attached to the content. The integrity information from the hash value in the common key encryption method is generated by the client, and is attached to the conditions of use of the data storage medium. The integrity information of the content, and the integrity information of the conditions of use are combined into a single piece of information, which is then managed as the index 701.

Even if the memory stick has a low throughput, the client 1 can export, to the memory stick, the content to which the signature is attached using the public key encryption method, without the need for lowering the protection level of the content in the memory stick.

Terminals having a low throughput can use the same content. In this arrangement, any devices can exchange contents.

A conversion of a content in the content import process or the content export process is discussed with reference to FIG. 27 through FIG. 29.

Figure 27:
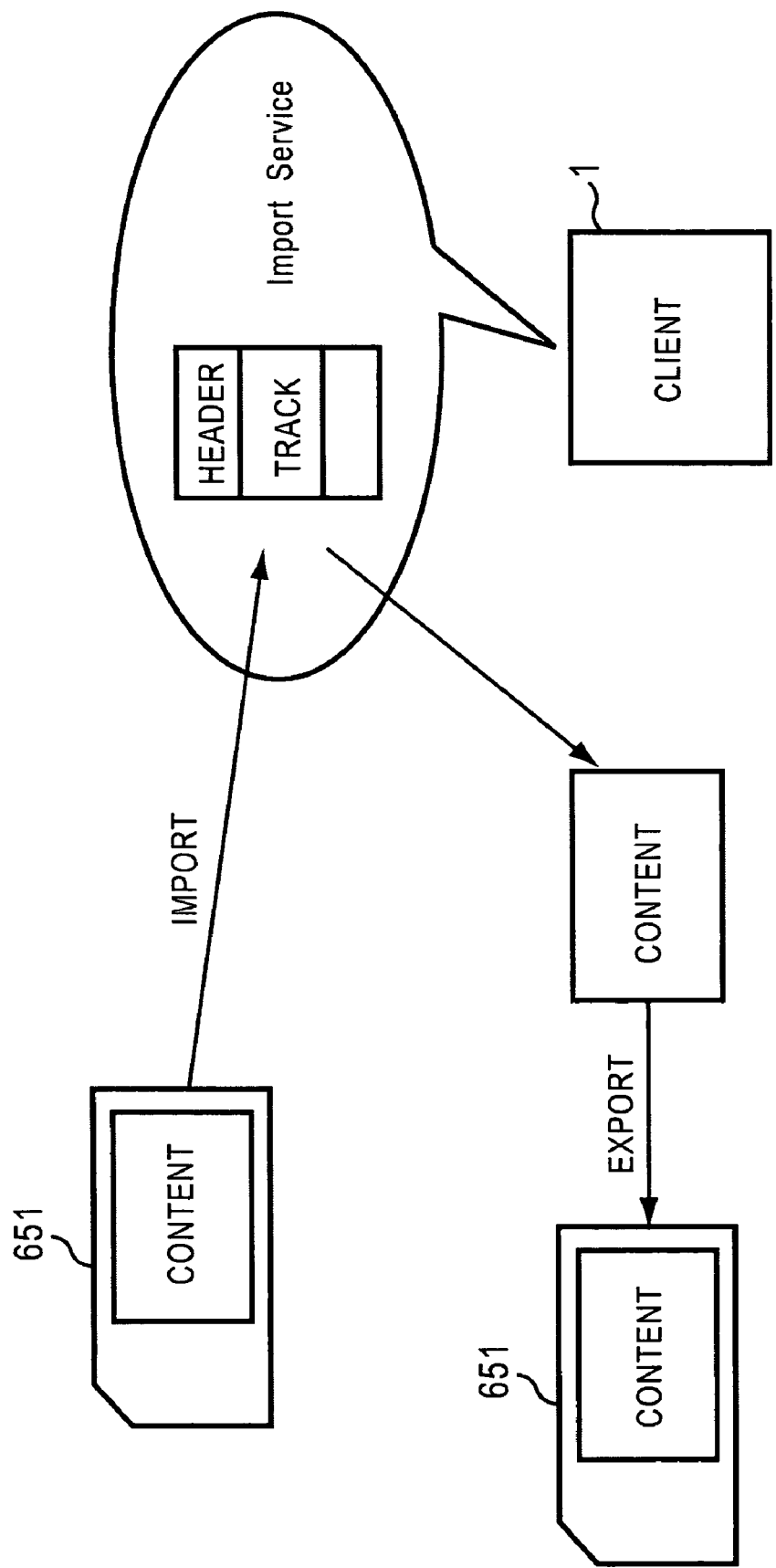
FIG. 27 illustrates the import and export of the content.

As shown in FIG. 27, a content is imported to the client 1 from the memory stick 651 and a content is exported from the client 1 to the memory stick 651 in a service corresponding to one category in the system of the present invention as already discussed with reference to FIG. 12.

The client 1 imports the content from the memory stick 651, assigns the content one service, and converts the content to be imported into a predetermined format.

The content of the client 1 has a format storing a plurality of types of data (data of sound, data of images, data of text, etc), such as QuickTime (trademark) format. The data of sound, the data of images, the data of text, etc. held in one content in the client 1 are mutually associated each other. For example, if the data of sound is data of music, the data of image represents the image of player of the music, and the text data is a decryption of the music or a lyric of the music.

When the client 1 exports the content to the memory stick 651 as one example of the storage medium, the data of sound track among the contents in formats that allow a plurality of types of data to be stored therewithin is converted into a format compatible with the memory stick 651, such as a memory stick format (MSA), and other data of the content is linked to the converted sound track.

Figure 28:
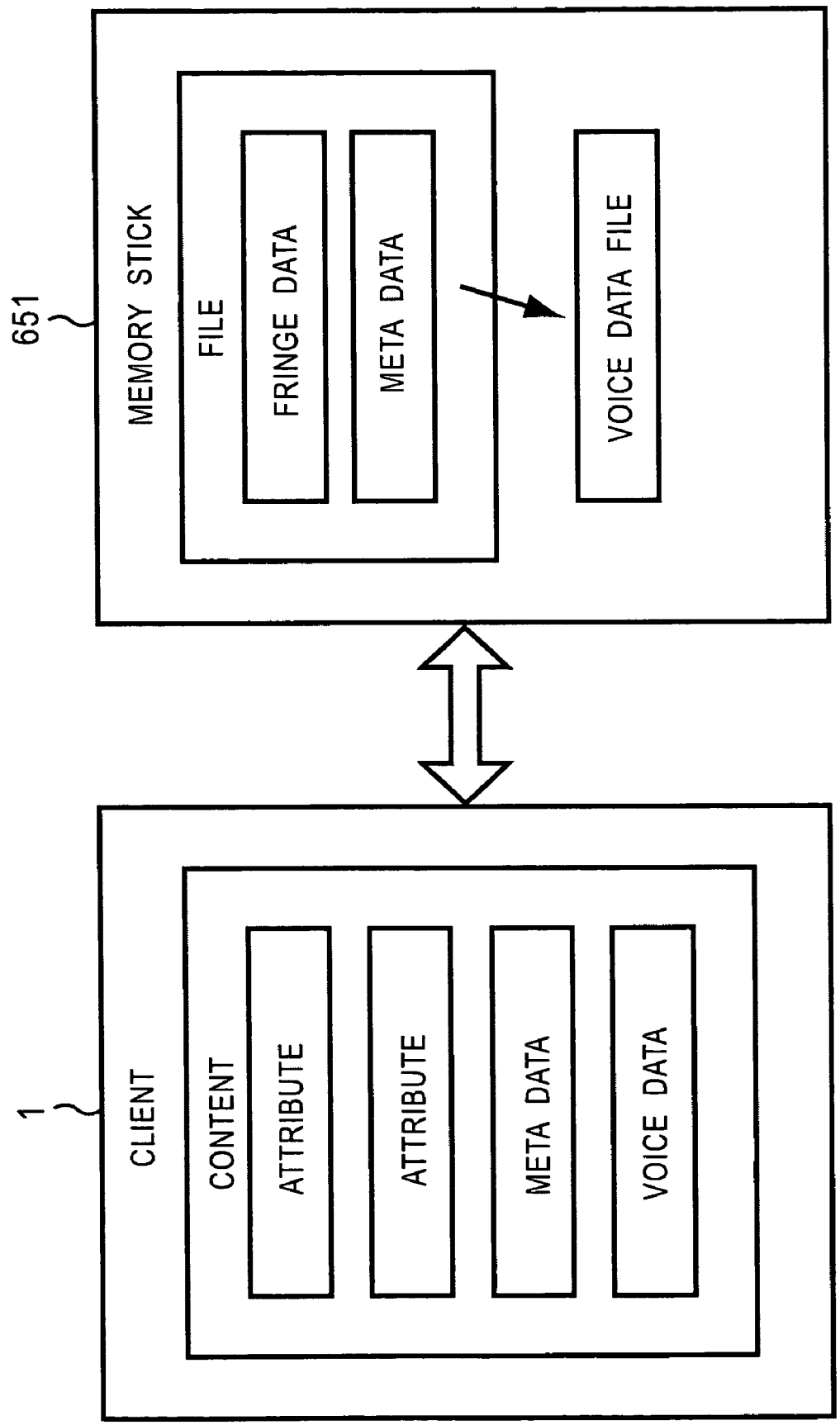
FIG. 28 illustrates an example of conversion of the content in one of the import and export processes.

When the content in the client 1 is exported to the memory stick 651 as shown in FIG. 28, the sound data contained in the content is extracted. The extracted sound data is converted into a sound data file. The sound data file is stored in the memory stick 651.

When the content in the client 1 is exported to the memory stick 651, the data of attribute contained in the content, namely, fringe data, together with meta data such as images and texts becomes a file different from the sound data file. The file containing the fringe data and the meta data is stored separately from the sound data file in the memory stick 651.

The sound data file, and the file holding the fringe data and the meta data shown in FIG. 28 are associated with the content stored in the memory stick 651 shown in FIG. 27.

When the content is imported from the memory stick 651 to the client 1, the sound data is extracted from the sound data file, and the extracted sound data is held in the content of the client 1 as the sound data.

When the content is imported from the memory stick 651 to the client 1, the fringe data held in the file in the memory stick 651 is handled as attribute data of the content of the client 1, and the meta data held in the file is handled as the meta data of the client 1.

When the content is imported (ripped) from a CD as another storage medium to the client 1, the client 1 already stores the service data for the import process and a sample right of use as default setting corresponding to an import service. The service data for the import process is identical to the service data listed in FIG. 8 except that the leaf ID is replaced with a unique ID.

When a program for executing an import process to the client 1 is installed in the client, a predetermined value as a unique ID for representing a node in the hierarchical tree structure discussed with reference to FIG. 10 is set. A predetermined ID is set as a right of use ID.

When the client 1 imports the content with a plurality of sample licenses stored, the client 1 may select a predetermined sample right of use from among the plurality of sample rights of use.

The service data for the import process may be acquired from a license server 4.

When the content is imported to the client 1 from the CD, the client 1 converts the content read from the CD into the format of the client 1, and further defines an appropriate attribute of the content. For example, the client 1 reads data relating to the substance of the content (for example, a record company ID or an artist ID) recorded on the CD from a TOC (Table of Contents) of the CD and then sets the data as the attribute of the content.

The client 1 binds a content generated in response to the content read from the CD and the right of use already stored. For example, a conditional equation such as import=true is expressed in a content condition contained the sample right of use, and the client 1 attaches information such as import=true to the attribute of the content. Since the attribute of the content read from the CD satisfies the content condition of the sample right of use in this way, the right of use generated from the sample permits the client 1 to use the content read from the CD.

For example, the client 1 generates a random number of a predetermined number of bits, and sets the generated random number to the content as the content ID.

Alternatively, the content ID may read from the TOC of the CD, and the read content ID may be set to the content.

Figure 29:
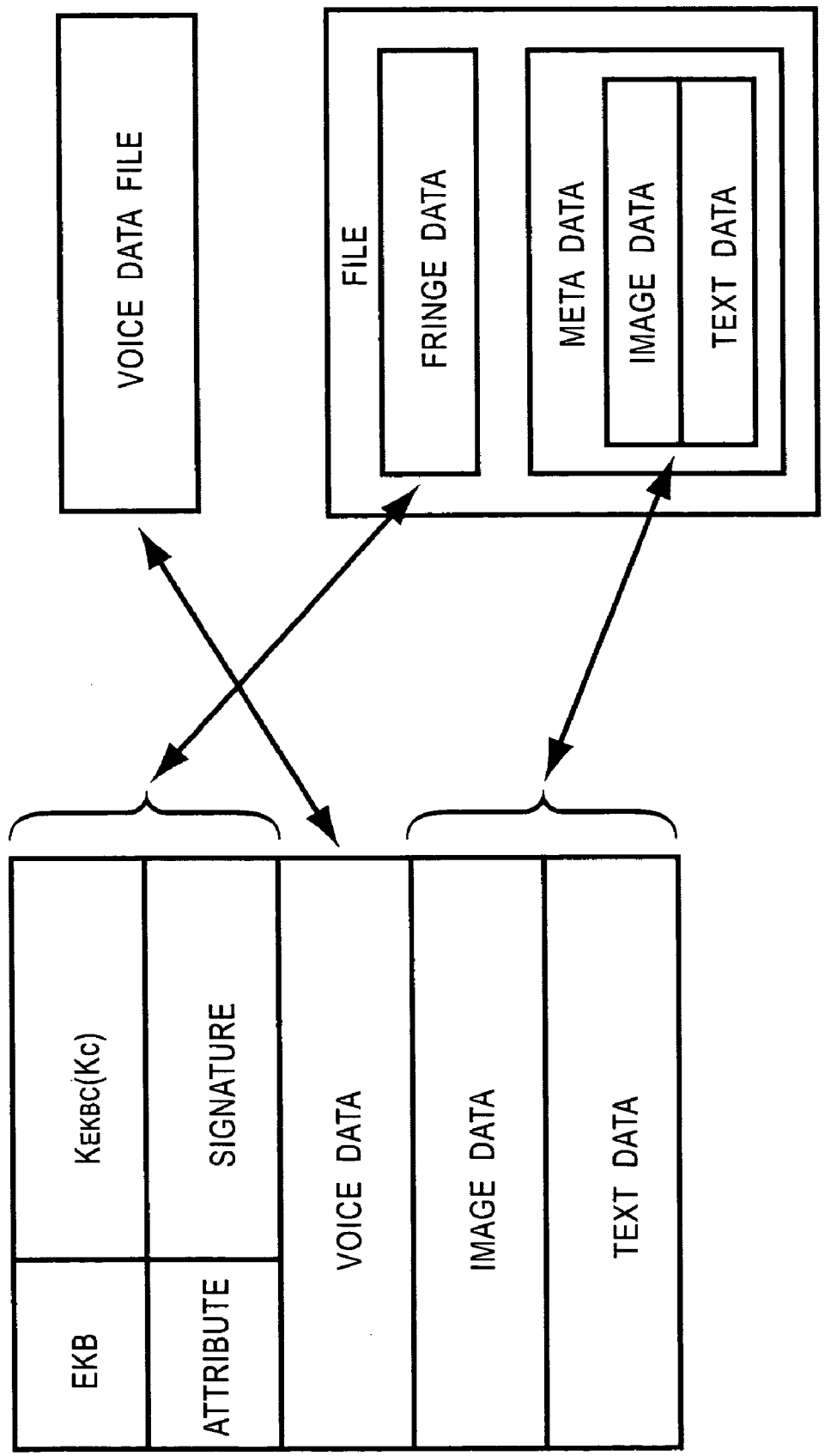
FIG. 29 illustrates an example of conversion of the content in one of the import and export processes.

FIG. 29 illustrates a more specific example of conversion in the import and export processes.

When a content in the client 1 is exported to the memory stick 651, the sound data is extracted from the content of the client 1, and the extracted sound data is converted into a sound data file. The sound data file is stored in the memory stick 651.

When the content in the client 1 is exported to the memory stick 651, EKB, KEKBC(KC), the data of the attribute, and the signature, contained in the content, are handled as the fringe data. The meta data such as the image data, the text-data, etc. is stored in the form as is in the memory stick 651 as the file together with the fringe data.

When the content is imported to the client 1 from the memory stick 651, the sound data is extracted from the sound data file, and the extracted sound data is stored as sound data (sound track) in the content in the client 1.

When the content is imported to the client 1 from the memory stick 651, the fringe data including EKB, $K_{EKBC}$ (Kc), the data of the attribute, and the signature, held in the file of the memory stick 651, is stored in a predetermined form in the content in the client 1 as the header of the content. The meta data including the image data and the text data is stored as the meta data of the content of the client 1, namely, in a track of the image and in a track of the text.

Figure 30:
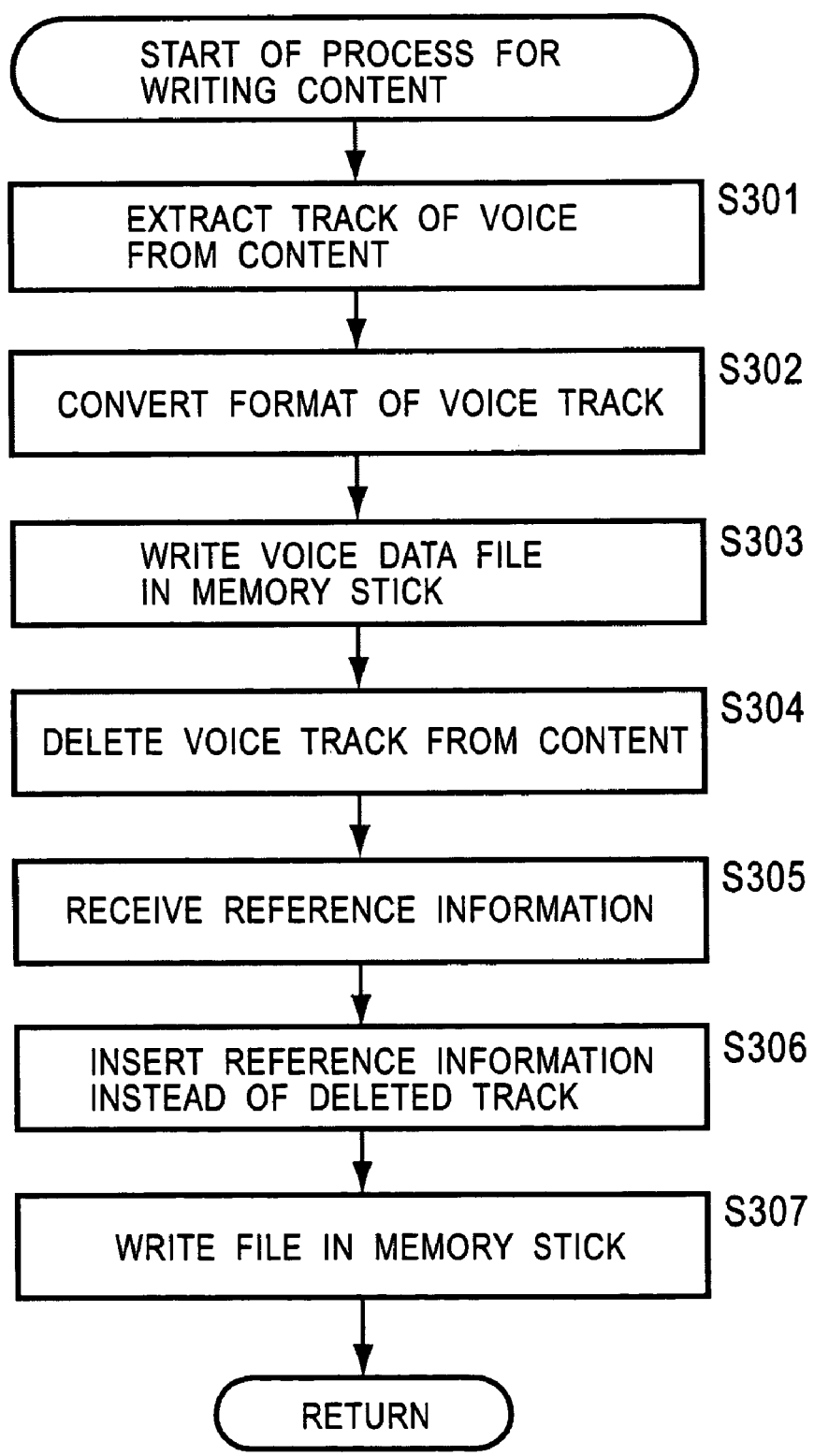
FIG. 30 is a flow diagram illustrating a process of the client 1 for writing the content.

FIG. 30 is a flow diagram illustrating a write process of the content in the client 1, corresponding to the process in step S222.

In step S301, the CPU 21 in the client 1 extracts the sound track from the content to be exported. In step S302, the CPU 21 in the client 1 converts the format of the sound track (data of sound) into a format the memory stick 651 can use, thereby generating a sound data file.

For example, the CPU 21 in the client 1 acquires a content key of the memory stick 651 from the memory stick 651, re-keys the data of sound of the content using the content key of the memory stick 651 (by encrypting, with the content key of the memory stick 651, the content data and the sound data achieved through the decryption process of EKB with DNK, the decryption of the content key, and the decryption of the content data), and generates a sound data file from the re-keyed sound data.

Alternatively, the memory stick 651 may re-key the sound data file.

In step S303, the CPU 21 in the client 1 writes the sound data file onto the memory stick 651.

In step S304, the CPU 21 in the client 1 deletes the sound track from the content to be exported. More specifically, the CPU 21 in the client 1 generates a file to be written onto the memory stick 651, based on data in the content required for decryption such as the attribute or EKB, and the meta data such as the image data or the text data. In the process in step S304, the attribute data of the content is handled as the fringe data of the file.

In step S305, the CPU 21 in the client 1 receives reference information, indicating the position of the sound data file in the recording medium (storage medium), transmitted from the memory stick 651.

In step S306, the CPU 21 in the client 1 inserts the reference information indicating the position of the sound data file in the recording medium (the storage medium) received in step S305 to replace a deleted track of sound.

In step S307, the CPU 21 in the client 1 writes the content containing the reference information of the sound data file, as a file, onto the memory stick 651, and then the process ends.

The file, containing the fringe data and the meta data, with the track of sound deleted, is not used in a replay device of the memory stick 651.

Figure 31:
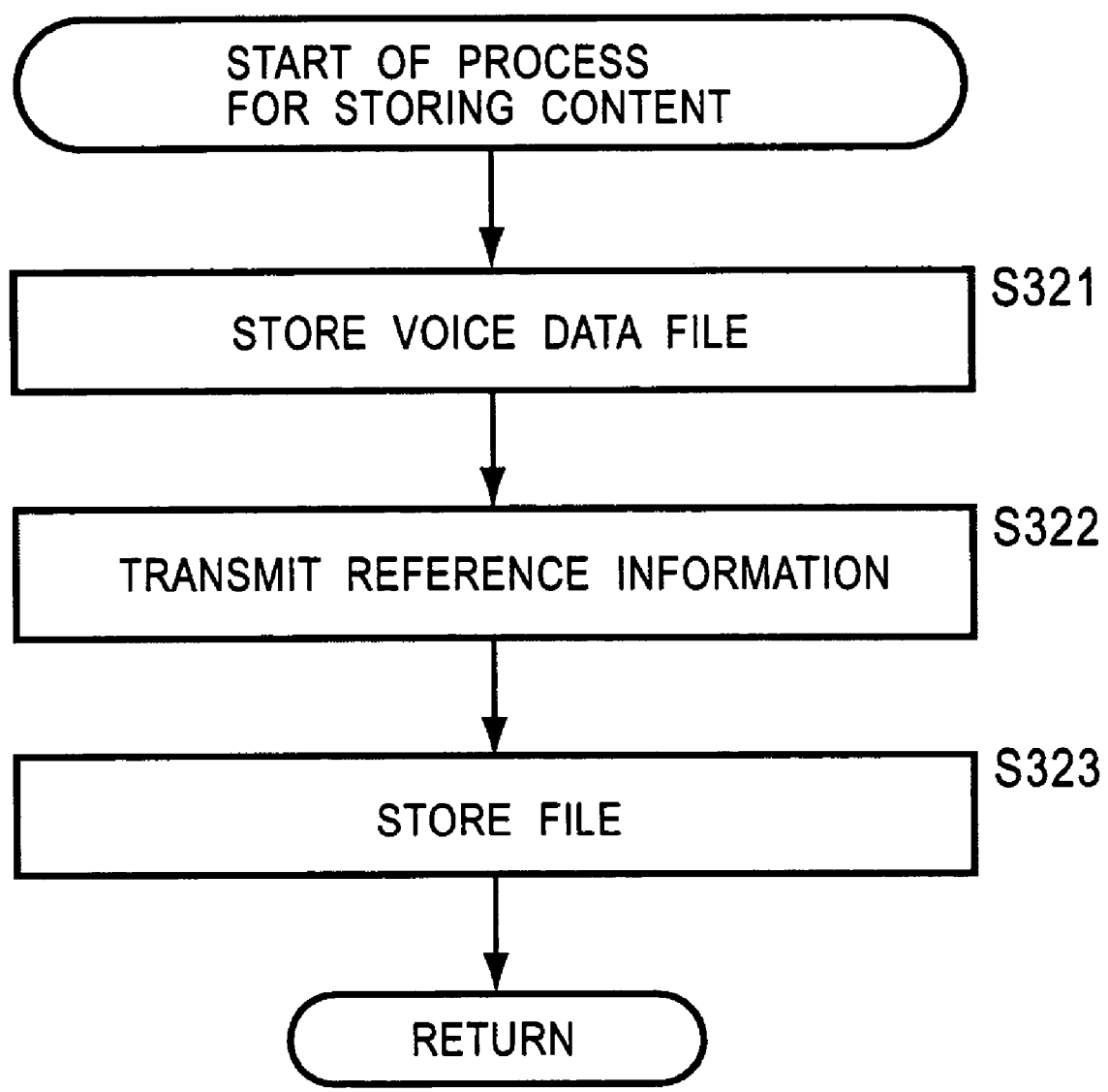
FIG. 31 is a flow diagram illustrating a process of a memory stick 651 for storing a content.

FIG. 31 is a flow diagram illustrating the storage process of the content in the memory stick 651, corresponding to the process in step S242.

In step S321, the memory control block 662 of the memory stick 651 receives the sound data file that has been transmitted from the client 1 performing the process in step S303, and stores the received sound data file in the flash memory 661. As a result, the memory stick 651 stores the sound data file including the sound track out of the content of the client 1. Since the sound data file has a file format compatible with the memory stick 651, the memory stick 651 can use the sound data file (causing a host device to replay the sound).

In step S322, the memory control block 662 of the memory stick 651 transmits the reference information that indicates the position of the sound data file stored in the flash memory 661 in the recording medium (the storage medium).

In step S323, the memory control block 662 of the memory stick 651 receives the file containing the reference information of the sound data file, transmitted from the client 1 performing the process in step S307, and then stores the received file in the flash memory 661. The process then ends.

A file having a link with the sound data file has no file format compatible with the memory stick 651, and the memory stick 651 is unable to use the data stored in the file.

The sound data file corresponding to the sound track of the content is stored in the memory stick 651, and other data such as the meta data and the attribute data of the content are stored in the memory stick 651 as the file.

Even when the content of the client 1 is exported to the memory stick 651, the data other than the sound data out of the information contained in the content is stored as the file. In this arrangement, the information contained in the content is stored in the memory stick 651 without any portion thereof missing.

The memory stick 651 may perform the process of inserting the reference information indicating the position of the sound data file in the recording medium (the storage medium). In this case, the content file with the sound track removed therefrom is transmitted from the client 1, and the memory control block 662 of the memory stick 651 inserts the reference information indicating the position of the sound data file in the recording medium (the storage medium).

The content import process of the client 1 is now discussed.

Figure 32:
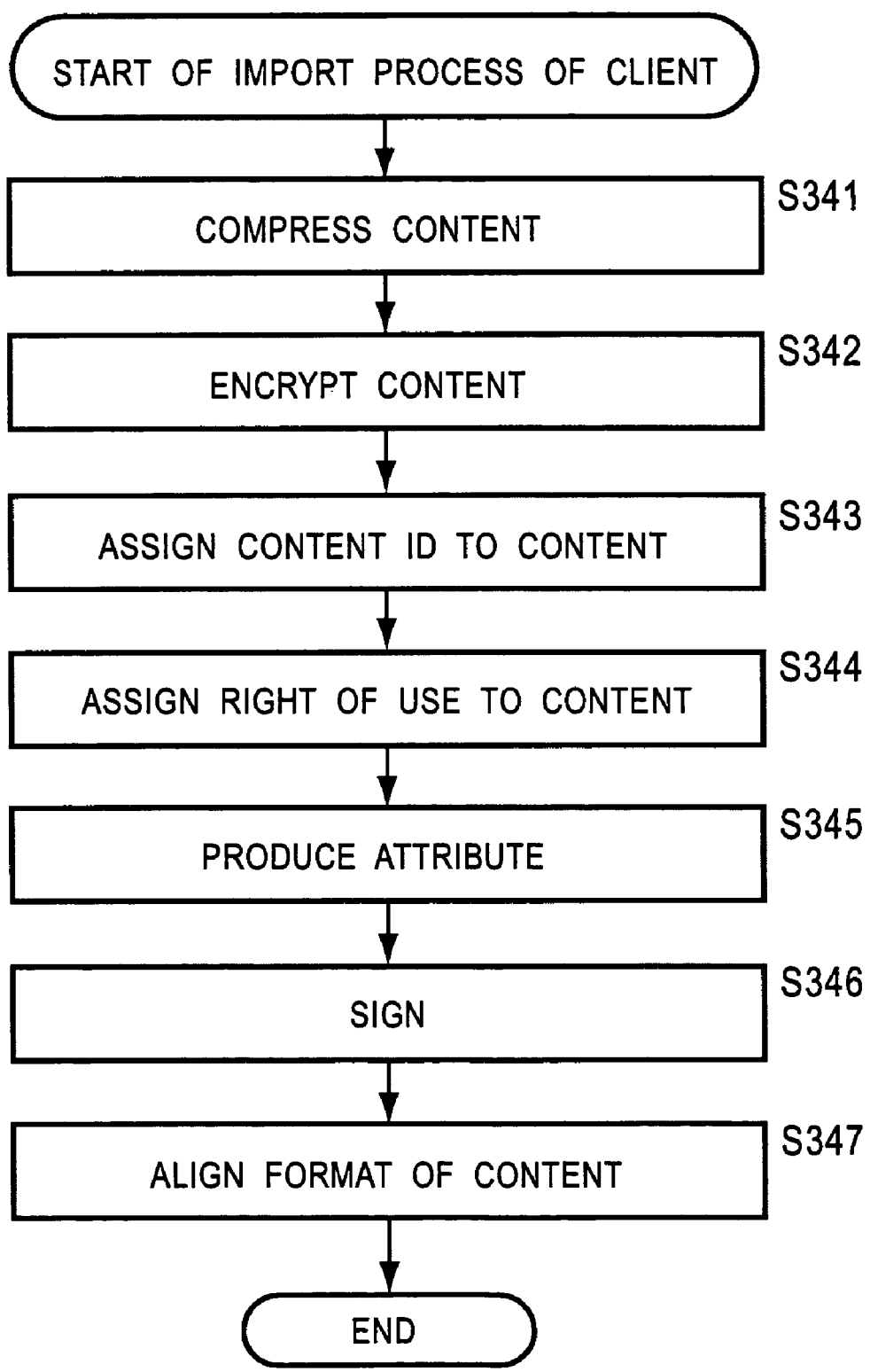
FIG. 32 is a flow diagram illustrating a process of the client 1 for importing a content stored in a CD.

FIG. 32 is a flow diagram illustrating the import process (a so-called ripping process) of the client 1 for importing a content recorded on the CD.

In step S341, the CPU 21 in the client 1 reads (acquires) the content from the CD which is the optical disk 42 loaded in the drive 30, and compresses (encodes) the read content using the ATRAC (Adaptive Transform Acoustic Coding) 3 method, for example.

In step S342, the CPU 21 in the client 1 causes the encryptor/decryptor 24 to encrypt the compressed content. For example, the compressed content is encrypted with the content key that has been generated using a random number, and the content key is then encrypted with the root key of EKB corresponding to an import category assigned to a node lower than the T-system category node. The content key is attached to the encrypted content.

In step S343, the CPU 21 in the client 1 assigns a content ID to the encrypted content. For example, the CPU 21 in the client 1 generates a random number of a predetermined number of bits, and assigns the generated random number to the content as the content ID. Alternatively, the CPU 21 in the client 1 may read the content ID contained in the TOC of the CD, and may assign the read content ID to the encrypted content.

In step S344, the CPU 21 in the client 1 assigns the right of use to the content. More specifically, a conditional equation like import=true is described in the content conditions of the right of use of the imported content, and the CPU 21 in the client 1 attaches the information like import=true to the attribute of the content. In this way, the attribute of the content read from the CD satisfies the content condition of the sample of the right of use. The right of use generated from the sample thus permits the client 1 to use the content read from the CD.

In step S345, the CPU 21 in the client 1 produces the attribute of the content. For example, the CPU 21 in the client 1 reads data relating to the substance of the content stored in the CD from the TOC (Table of Contents) of the CD, and sets the data as the attribute of the content. Alternatively, the CPU 21 in the client 1 may set data, supplied from the input unit 26 in response to an operation by the user, as the attribute of the content.

In step S346, the CPU 21 in the client 1 generates an electronic signature based on the produced attribute of the content, and attaches the generated electronic signature to the content. For example, the CPU 21 in the client 1 generates the electronic signature using the user's own private key contained in the certificate of the service data for the import service.

In step S347, the CPU 21 in the client 1 aligns the format of the generated content to the format of the content shown in FIG. 5, and the process ends.

Figure 33:
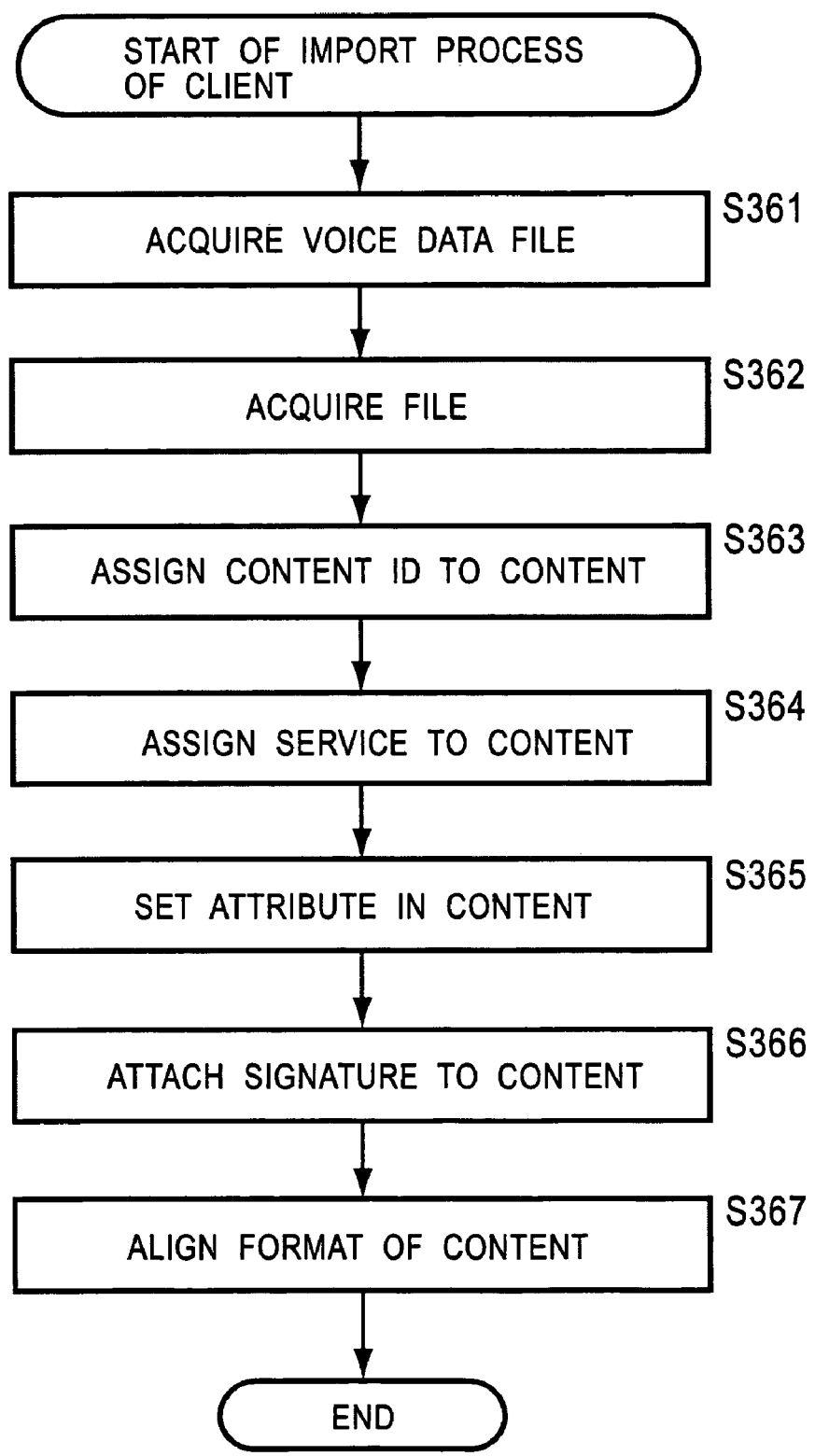
FIG. 33 is a flow diagram illustrating a process of the client 1 for importing a content stored in the memory stick 651.

The import process of the client 1 for importing the compression encoded and encrypted content stored in the memory stick 651 is discussed with reference to a flow diagram illustrated in FIG. 33.

In step S361, the CPU 21 in the client 1 reads the sound data file as the content from the memory stick 651, which is the semiconductor memory 44 loaded in the drive 30, and then acquires the sound data file.

In step S362, the CPU 21 in the client 1 reads the file containing the fringe data and the meta data from the memory stick 651 loaded in the drive 30, and acquires the file containing the fringe data and the meta data.

In step S363, the CPU 21 in the client 1 assigns the content ID to the read content. More specifically, the CPU 21 in the client 1 extracts the content ID contained in the fringe data of the file, and assigns the extracted content ID to the content.

In step S364, the CPU 21 in the client 1 assigns the right of use to the content. More specifically, the CPU 21 in the client 1 assigns the attribute contained in the fringe data of the file to the content.

In step S365, the CPU 21 in the client 1 sets the attribute of the content. More specifically, the CPU 21 in the client 1 extracts the attribute contained in the fringe data, and sets the extracted attribute to the content.

In step S366, the CPU 21 in the client 1 attaches an electronic signature to the produced content. The CPU 21 in the client 1 extracts the electronic signature contained in the fringe data of the file, and attaches the extracted electronic signature to the content.

In step S367, the CPU 21 in the client 1 aligns the format of the produced content, and the process ends. More specifically, the CPU 21 in the client 1 converts the sound data file to the method of the sound track of the content of the client 1, and inserts the sound track into the file, thereby achieving the format of the content discussed with reference to FIG. 5.

In this way, contents are imported and exported between devices different in method and format and between recording media (the storage media) different in method and format.

In this arrangement, information missing is prevented in the import and export processes between the devices different in method and format and between the recording media (the storage media), and imported contents are handled in a consistent manner.

When the memory stick 651 is designed to allow the content in this way, a content replayable on a replay device for the memory stick may be stored in the memory stick 651.

The predetermined type of data contained in the content is extracted, the format of the extracted data is converted to the predetermined format compatible with the recording medium, the predetermined file is produced from the data required to decrypt the content or other type of date, contained in the content, the data in the converted format and the file are linked, and the writing of the data in the converted format and the file onto the storage medium is controlled. In the above series of operations, the content is exported with information missing prevented. Exported contents are handled in the same way other contents.

If the memory stick 651 stores the content in the converted format, the content is used on the replay device of the memory stick without modifying the structure of the replay device.

When the memory stick 651 controls the storage of a content, in a format compatible therewith, containing a predetermined type of data, and an information processing apparatus controls the storage of a file containing data required to decrypt a content, or another type of data corresponding to the content, the content is imported with information missing controlled. The imported content is handled in the same way as other contents.

If the importing of the content is enabled, the content is acquired.

The content composed of a predetermined type of data is acquired from the storage medium, the file containing at least one of data linked to the content and required to decrypt the content and data of another type corresponding to the content is acquired from the storage medium, and the format of the content is converted into the format compatible with the information processing apparatus based on the acquired file. In such an arrangement, the content is imported with information missing controlled. The imported content is handled in the same way as other contents.

If the writing of the content onto the storage medium is enabled, the content is exported to the storage medium.

The content data contained in the content is extracted, the format of the extracted content data is converted to the predetermined format compatible with the storage medium, the predetermined file is generated from the data contained in the content excluding the content data, the reference information of the content data in the converted format is attached to the file, and the writing of the content data in the converted format and the file to the storage medium is controlled. In such an arrangement, the content is exported with information missing controlled. The exported content is handled in the same way as other contents.

If the content is acquired from the storage medium, the content stored in the storage medium can be imported.

The content data is acquired from the storage medium, the acquired content is converted to the predetermined format to produce the content, the content data in the converted format contained in the produced content is encrypted, the key information to decrypt the encrypted content data is attached to the content, and the information to associate the right of use required to use the content with the content is attached to the content. In such an arrangement, the content is imported with information missing controlled. The imported content is handled in the same way as other contents.

In the above discussion, the client imports or exports the content from or to the memory stick. Alternatively, the client imports or exports the content from or to a portable device (PD) as another example of a content storage device. Mores specifically, the client exports the content to the storage medium mounted on the content storage device, or imports the content from the storage medium mounted on the content storage device.

The client may import or export the content from or to a memory stick mounted on the PD. In this case, the mutual authentication process is performed between the client and the PD, and then performed between the PD and the memory stick.

The client implementing the present invention may be one of PDAs (Personal Digital Assistants), a cellular phone, and a game playing machine in addition to a so-called personal computer.

When the above series of processes is performed in software, a program of the software may be installed through a network or from a recording medium in a computer built in dedicated hardware or in a general-purpose personal computer that performs a variety of functions with a variety of programs installed therein.

As shown in FIG. 2, the recording medium may be not only a package medium distributed to supply the user with the program, separate from the main unit of the apparatus shown in FIG. 2, such as one of the magnetic disk 41 (including a floppy disk), the optical disk 42 (including CD-ROM (Compact Disk-Read Only Memory), and DVD (Digital Versatile Disk)), the magneto-optical disk 43 (including an MD (Mini-Disk)(trademark)), and the semiconductor memory 44, each storing the program, but also one of the ROM 22 and a hard disk contained in the storage 28, each storing the program, supplied in the main unit of the apparatus to the user.

In the description of the present invention, the steps describing the program stored in the recording medium may be performed sequentially as described in time axis. But the steps are not necessarily sequentially performed in time axis, and may be performed in parallel or separately.

A program for executing a security-related process is preferably encrypted to prevent the program from being analyzed. For example, the program of a process for performing an encryption may be constructed as a tamper-resistant module.

In the above-referenced embodiments, the attribute of the content and the content conditions of the right of use are used to identify the right of use required to use the content. The present invention is not limited to this method. For example, the content may contain the right of use ID required to use the content. In this case, the designating of the content uniquely determines the right of use required to use the content, and there is no need for a process for determining a match between the right of use and the content.

INDUSTRIAL APPLICABILITY

In accordance with a first invention, a content is exported to a storage medium.

Furthermore in accordance with the first invention, the content is exported with information missing controlled. The storage medium handles exported contents in the same way as other contents.

In accordance with a second invention, a content stored in the storage medium can be imported.

Furthermore, in accordance with the second invention, the content is imported with information missing controlled. Imported contents are handled in the same way as other contents.

The invention claimed is:

1. An information processing apparatus for outputting content to a storage medium, comprising:
   extracting means for extracting content data contained in the content, the content comprising the content data and separate attribute data for the content data;
   converting means for converting a format of the extracted content data into a predetermined format compatible with the storage medium by encrypting the extracted content data with a key specific to the storage medium;
   generating means for generating a message authentication code based on conditions of use for the extracted content data;
   output means for outputting the extracted content data, the conditions of use for the extracted content data, and the message authentication code to the storage medium;
   receiving means for receiving reference information indicating a position of the content data on the storage medium;
   generating means for generating a file from the attribute data;
   attaching means for attaching the reference information to the file; and
   wherein the output means outputs the file to the storage medium.

2. An information processing apparatus according to claim 1, further comprising write control means for controlling the writing of information, concerning a right of use required to use the content, to the storage medium.

3. The information processing apparatus according to claim 1, wherein the attribute data includes a content ID.

4. The information processing apparatus according to claim 1, wherein the attribute data includes a record company ID.

5. The information processing apparatus according to claim 1, wherein the attribute data includes an artist ID.

6. The information processing apparatus according to claim 1, wherein the key specific to the storage medium is received from the storage medium.

7. The information processing apparatus according to claim 1, further comprising calculating means for calculating an integrity check value based on an index containing a pointer to the extracted content data, the conditions of use and the message authentication code.

8. An information processing method for outputting content to a storage medium, comprising:
   extracting content data contained in the content, the content comprising the content data and separate attribute data for the content data;
   converting a format of the extracted content data into a predetermined format compatible with the storage medium by encrypting the extracted content data with a key specific to the storage medium;
   generating a message authentication code based on conditions of use for the extracted content data;
   outputting the extracted content data, the conditions of use for the extracted content data, and a message authentication code to the storage medium;
   receiving reference information indicating a position of the content data on the storage medium;
   generating a file from the attribute data;
   attaching the reference information to the file; and
   outputting the file to the storage medium.

9. A recording medium storing a computer readable program for causing a computer to perform a method for processing information for outputting content to a storage medium, the method comprising:
   extracting content data contained in the content, the content comprising the content data and separate attribute data for the content data;
   converting a format of the extracted content data into a predetermined format compatible with the storage medium by encrypting the extracted content data with a key specific to the storage medium;
   generating a message authentication code based on conditions of use for the extracted content data;
   outputting the extracted content data, the conditions of use for the extracted content data, and the message authentication code to the storage medium;
   receiving reference information indicating a position of the content data on the storage medium;
   generating a file from the attribute data;
   attaching the reference information to the file; and
   outputting the file to the storage medium.

* * * * *